United States Patent [19]
Bales et al.

[11] Patent Number: 5,666,399
[45] Date of Patent: Sep. 9, 1997

[54] SOFTWARE ARCHITECTURE FOR PROVIDING COMMUNICATION FEATURES TO DIFFERENT TYPES OF WIRELESS TELEPHONES VIA DIFFERENT COMMUNICATION SWITCHING SYSTEMS

[75] Inventors: Bruce Merrill Bales, Louisville; Craig Steven Chapel, Westminster; David Lee Chavez, Jr., Thornton; Robert Louis Crumpley, Westminster; Lisa P. Happel, Broomfield; Sandra Sue North, Berthoud, all of Colo.

[73] Assignee: Lucent Technologies Inc., Murray Hill, N.J.

[21] Appl. No.: 414,609

[22] Filed: Mar. 31, 1995

[51] Int. Cl.[6] .................................................. H04Q 7/20
[52] U.S. Cl. .................................. 379/419; 379/207
[58] Field of Search ............................... 379/58, 59, 63, 379/201, 207, 219, 220, 229; 455/33.1, 54.1

[56] References Cited

U.S. PATENT DOCUMENTS

| | | | |
|---|---|---|---|
| 4,680,786 | 7/1987 | Baker et al. | 379/59 X |
| 5,353,333 | 10/1994 | Fuentes | 379/59 |
| 5,390,241 | 2/1995 | Bales et al. | 379/207 |
| 5,420,916 | 5/1995 | Sekiguchi | 379/229 X |
| 5,448,631 | 9/1995 | Cain | 379/207 X |
| 5,471,471 | 11/1995 | Freeburg et al. | 379/63 X |
| 5,502,757 | 3/1996 | Bales et al. | 379/58 |

*Primary Examiner*—Dwayne Bost
*Assistant Examiner*—William G. Trost
*Attorney, Agent, or Firm*—John C. Moran

[57] ABSTRACT

A mobility management system and a traditional telecommunication switching system provide telecommunication terminal features by the mobility management system executing a software architecture that utilizes a unique terminal management application for each type of wireless terminal and a unique terminal emulator application for each type of telecommunication link that interconnects the mobility management system to the telecommunication switching system. There is an individually assigned telecommunication link for each wireless terminal. The terminal management applications and the terminal emulator applications communicate utilizing an internal message protocol. In response to a wireless terminal requesting actuation of a feature, a terminal management application converts that request into the required internal protocol messages and transmits the internal protocol messages to the terminal emulator application that controls the telecommunication link assigned to the wireless terminal. In response to the internal protocol messages, the terminal emulator application emulates the type of telecommunication terminal that normally would be connected to the assigned telecommunication link. The telecommunication switching system is responsive to the emulation to provided the requested feature as if telecommunication terminal was connected to the assigned link. The responses of the telecommunication switching system received via the assigned telecommunication link are converted to internal protocol messages and transmitted back to the terminal management application. The terminal management application converts and transmits the responses to the wireless terminal. The same internal protocol messages are used to invoke a particular feature regardless of the telecommunication terminal type or telecommunication link type.

38 Claims, 14 Drawing Sheets

FIG. 3
TABLE 2

SETUP
SETUP_ACKnowledge
CALL_PROCeeding
ALERT
CONNect
CONNect_ACKnowledge
DISConnect
RELease
RELease_COMplete
INFOrmation
CONFERENCE_ACKnowledge
CONFERENCE_REJect
TRANSFER_ACKnowledge
TRANSFER_REJect
DROP_ACKnowledge
DROP_REJect
HOLD_ACKnowledge
HOLD_REJect
PROGress
ATT RECONNect_ACKnowledge
ATT RECONNect_REJect
STATUS_ENQuiry
STATUS
ATT MANagement_INFOrmation

FIG. 2
TABLE 1

| | CODE NUMBER | FUNCTION |
|---|---|---|
| 201 | 1 | SWITCH OVER |
| 202 | 2 | TRANSFER |
| 203 | 3 | CONFERENCE |
| 204 | 4 | DROP |
| 205 | 5 | HOLD |
| 206 | 6 | RETRIEVE |
| 207 | 7 | PICKUP |
| 208 | 8 | AUTO CALL BACK |
| 209 | 9 | CALL COVERAGE (SEND ALL CALLS) |
| 210 | 10 | CALL FORWARDING |
| 211 | 11 | CALL FORWARDING CANCEL |
| 212 | 12 | DIGITS IN MESSAGE |
| 213 | 13 | AUTO CALL BACK CANCEL |
| 214 | 20 | SUPPLEMENTARY ACKNOWLEDGE |
| 216 | 21 | DISPLAY INFORMATION |
| 217 | 22 | CALL PENDING |
| 218 | 23 | COM. SWITCHING SYSTEM FAILURE |
| 219 | 24 | INTERNAL INFO |

TABLE 3

SETUP
ALERT
CONnect
CONNect_ACKnowledge
DISConnect
RELease
RELease_COMplete
INFOrmation
CONFERENCE
TRANSFER
DROP
HOLD
PROGress
ATT RECONNect
STATUS
MANagement_INFOrmation

5,666,399

SOFTWARE ARCHITECTURE FOR PROVIDING COMMUNICATION FEATURES TO DIFFERENT TYPES OF WIRELESS TELEPHONES VIA DIFFERENT COMMUNICATION SWITCHING SYSTEMS

TECHNICAL FIELD

This invention relates to telecommunication switching systems and, in particular, to the provision of communication features on telecommunication switching systems.

BACKGROUND OF THE INVENTION

In providing personal communication services (PCS) or cellular service, a common system architecture utilizes a traditional telecommunication switching system to provide telecommunication features and billing and utilizes a second telecommunication system to provide the necessary mobility operations with respect to the PCS telephones (also referred to as wireless handsets). The second communication system is interconnected to the traditional communication switching system via individual analog telephone links. The second switching system has a dedicated telephone link for each PCS telephone serviced by the second telecommunication system. In the case of BRI interface and similar proprietary links, each B channel is considered a separate link. By dedicating one telephone link per PCS telephone, the second telecommunication switching system simulates on each of the telephone links the type of telephone with which the traditional communication switching system is programmed to operate. This allows the traditional telecommunication system to provide its normal telecommunication features with no change to the program being executed by the traditional communication switching system. In addition, the traditional telecommunication switching system can provide billing in a routine manner. Another advantage of this architecture is that PCS telephones can be added to an existing traditional telecommunication switching system such as a PBX. This allows the PBX to handle wired and PCS telephones. This is advantageous for many customers who have an existing PBX or who are purchasing a new PBX which must handle both wired and wireless telephones.

This system architecture does suffer from one major problem. This problem is that there are a large number of types of PCS telephones that are made by a number of different manufacturers. In addition, each manufacturer has different types of PCS telephones that invoke features in different ways. In addition, there are a large number of telephone links. Most manufacturers of PBXs have one or more proprietary digital telephone links. Furthermore, the manner in which features are invoked on an analog link varies with the different manufacturers of PBXs. Also, analog telephone links function differently for different countries. Finally, even on digital links, the features may well be invoked in different manners for the same digital link even for the same type of PBX from the same manufacturer. Prior art systems have resolved this problem by writing a unique software program for each combination of a type of PCS telephone and set of operations for a given telephone link. The resulting software is very costly to program, prone to software errors, and difficult to administer.

SUMMARY OF THE INVENTION

The foregoing problem is solved and a technical advance is achieved by a mobility management system and a traditional telecommunication switching system that are providing terminal features. Advantageously, the mobility management system executes a software architecture that utilizes a unique terminal management application for each type of wireless terminal and a unique terminal emulator application for each type of telecommunication link that interconnects the mobility management system to the telecommunication switching system. The terminal management applications and the terminal emulator applications communicate utilizing an internal message protocol. There is an individually assigned telecommunication link for each wireless terminal. In response to a wireless terminal requesting actuation of a feature, a terminal management application converts that request into the required internal protocol messages and transmits the internal protocol messages to the terminal emulator application that controls the telecommunication link assigned to the wireless terminal. In response to the internal protocol messages, the terminal emulator application emulates the type of telecommunication terminal that normally would be connected to the assigned telecommunication link. The telecommunication switching system is responsive to the emulation to provided the requested feature as if telecommunication terminal was connected to the assigned link. The responses of the telecommunication switching system received via the assigned telecommunication link are converted to internal protocol messages and transmitted back to the terminal management application. The terminal management application converts and transmits the responses to the wireless terminal. The same internal protocol messages are used to invoke a particular feature regardless of the telecommunication terminal type or telecommunication link type.

If a new wireless terminal type is to be used, only a new terminal management application must be installed on the mobility management system. Similarly, if a different type or use of an interconnecting telecommunication link is installed between the mobility management system and the telecommunication switching system, only a new terminal emulator application must be installed.

The mobility management system includes one or more switch nodes. The terminal management applications can be executed in different switch nodes than the switch nodes that are executing the terminal emulator applications. Base stations that provide the wireless interface between switch nodes and wireless terminals are connected to switch nodes executing the terminal management applications. Those switch nodes can be remoted over high capacity telecommunication links from switch nodes executing the terminal emulator applications.

BRIEF DESCRIPTION OF THE DRAWING

FIGS. 2, 3, and 4 illustrate messages utilized by the system of FIG. 1;

FIG. 5 illustrates a software architecture for use with the inventive concept;

DETAILED DESCRIPTION

Figure 1:
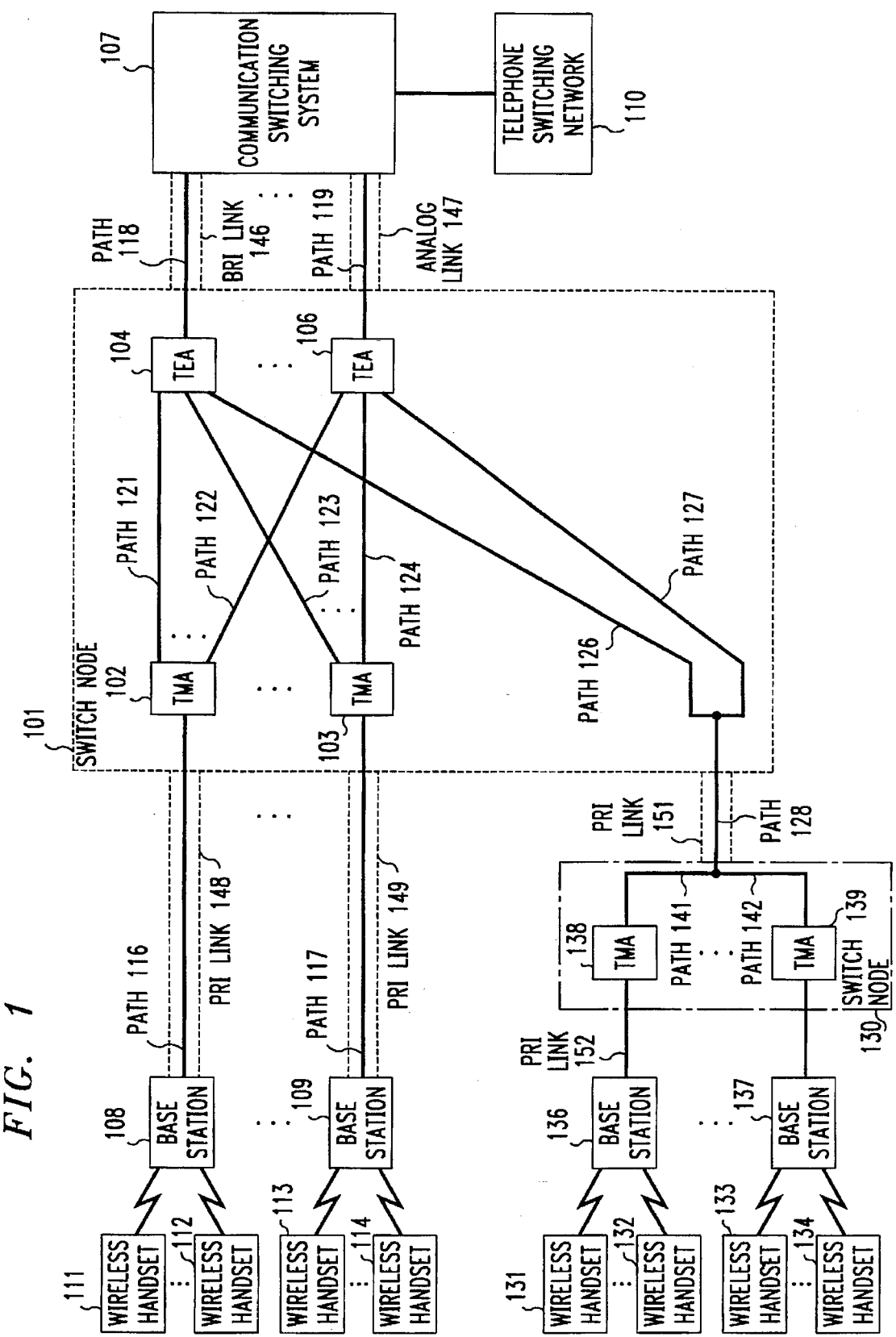
FIG. 1 illustrates a system for performing the inventive concept.

FIG. 1 illustrates a system for implementing an inventive concept. With respect to base stations 108 and 109, switch node 101 performs the mobility operations for wireless handsets 111 through 114 and 131 through 134. With respect to communication switching system 107, switch node 101 emulates telephones that normally would be connected to links 146 through 147. Links 146 through 147 can be analog, basic rate interface (BRI), or proprietary digital telephone physical links. In addition, these links can be channels each dedicated to a telephone within a BRI link or a TR303 link such as provided by the AT&T 5ESS telecommunication switching system. Paths 118 through 119 provide signaling for links 146 through 147, respectively, between switch node 101 and communication switching system 107. Communication switching system 107 advantageously may be a Definity® G3 that is manufactured by AT&T. One skilled in the art can readily see that communication switching system 107 could be any other type of PBX or central office switching system. The various paths interconnected to and within switch node 101 represent logical control paths. The terminal management application (TMA) and terminal emulator application (TEA) are applications running at the top of a software hierarchy that will be described in greater detail later. Paths 116 through 117 that interconnect base station 108 through 109 to switch node 101 are physically transported on primary rate interface (PRI) links 148 through 149, respectively. Signaling path 128 that interconnects switch node 130 and switch node 109 is physically transported on PRI link 151. If each base station can only handle a small number of active wireless handsets, links 148 through 149 can be BRI links. Paths 118 through 119 are signaling paths that are transported on individual telephone links 146 through 147, respectively.

Switch node 130 interconnects base stations 136 through 137 to switch node 101. Switch node 130 performs the TMA functions before transferring the control information via signaling path 128 to TEA 104 or 106. Switch node 130 could be replaced by a network of switch nodes. Such a network of switch nodes is disclosed in U.S. Pat. No. 5,182,751. Wireless handsets 111 through 114 and 131 through 134 can register on any of the base stations illustrated in FIG. 1. Such base stations are well known in the art. Although wireless handsets (also referred to as wireless or PCS telephones) are described, one skilled in the art could see that other types of wireless telecommunication terminals could be used in place of the wireless handsets. The base station is responsible for routing the signaling information to the proper TMA in switch node 101. If the base station is connected to a remote switch node such as switch node 130, the base station routes the signaling information to a TMA within the remote switch node. Switch node 101 is responsive to the data or voice information of the call to switch that information through switch node 101 via an internal switching network to the telephone link associated with the wireless telephones. In addition, FIG. 1 illustrates that base station 108 only has a signaling path to TMA 102. In addition, base station 108 would also have a signaling path to TMA 103 if a wireless handset registered on base station 108 was of the type serviced by TMA 103. The same is also true of base station 109.

Figure 16:
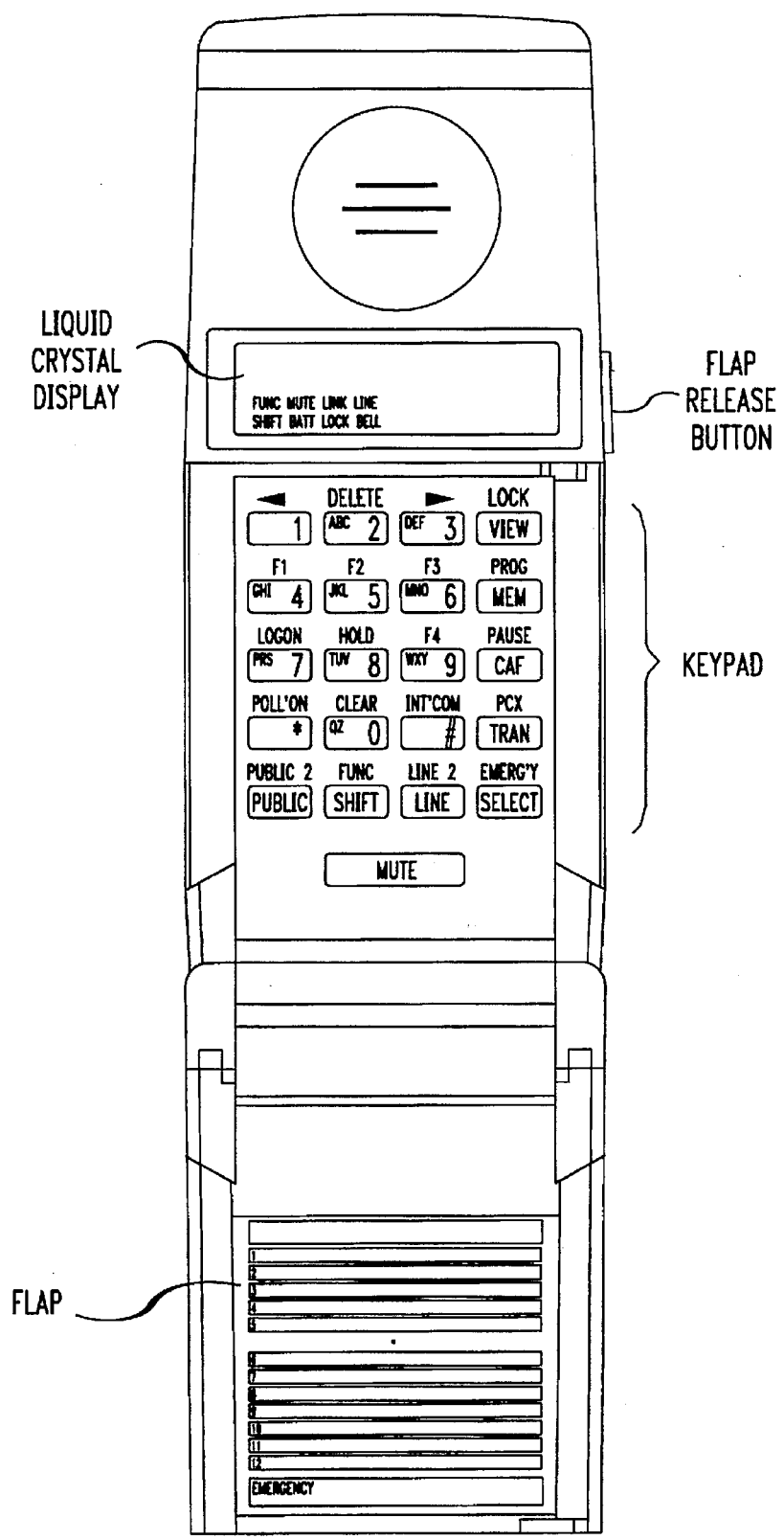
FIG. 16 illustrates a wireless handset.

Consider now the following example to better understand how the system of FIG. 1 functions. Wireless handset 111 has a button labeled call forwarding as illustrate in FIG. 16. As an alternative, wireless handset 111 could have a function key that, upon activation, displays the provided features, and the user then selects one of the features. When the button is activated a first time, the user also dials a designation telephone number to which all incoming calls are to be transferred. When the user wishes to cancel the call forwarding, the user actuates the call forwarding button a second time. For sake of the present example, assume that wireless handset is serviced by link 147 which is an analog link connected to communication switching system 107. Base station 108 is responsive to information that the call forwarding button has been actuated and the dialed digits to transfer this information to TMA 102 via signaling path 116 of PRI link 148. TMA 102 is responsive to the message from wireless handset 111 to determine the state of wireless handset 111 with respect to call forwarding. TMA 102 determines that wireless handset 111 is actuating call forwarding. First, TMA 102 sends a CALL primitive to TEA 106. In response, TEA 106 goes off hook and returns an ANSWERED CALL primitive to TMA 102 after waiting a predetermined amount of time. TMA 106 causes a talk path to be established between wireless handset 111 and analog link 147. Note, if a call was presently active on analog link 147, TEA 106 first does a flash hook and then returns the ANSWERED CALL primitive. TMA 102 then utilizes the common protocol between TMA and TEA applications to send the call forwarding message (code number 10) listed in Table 1 of FIG. 2 to TEA 106 via path 122. TMA 102 includes the telephone number to which the calls are to be transferred. Since TEA 106 is connected to an analog path, it must simulate dialing from an analog telephone set by first going off hook and receiving. dial tone. TEA 106 directs that the multifrequency dialing tones for string "* 21" be transmitted to communication switching system 107 along with the destination telephone number to which calls are to be transferred. These dialing tones may vary from country to country. The digit string invokes call forwarding and communication switching system 107 responds with a second dial tone. After sending the digit string, TEA 106 waits a predefined amount of time before requesting that the destination telephone number be sent. Communication switching system 107 responds to the request for call forwarding either with a confirmation tone or an error tone. Since wireless handset 111 is connected to analog link 147 by a talk path through switch node 101, the user hears either the confirmation or error tone and from that can ascertain whether or not the feature has been invoked. If there had been an active call on analog link 147, TEA 106 does a second flash hook as predetermined after the sending of the destination telephone number. After activation of call forwarding, when a call is received by communication switching system 107 for wireless handset 111, communication switching system 107 forwards this call to the number designated by wireless handset 111 for call forwarding.

An alternative method for performing the call forwarding feature is for the user not to dial the destination telephone number immediately after activating the call forwarding button; but, rather, to wait until the second dial tone is heard from communication switching system 107 over the talk path. At that time, the user dials the destination telephone number to which the calls are to be forwarded. In response to this dial telephone number, TMA 102 transfers the dial digits using a digits message (code number 12). Upon receiving the digits message, TEA 106 directs that this telephone number be sent to communication switching system 107 via analog link 147 as a series of multifrequency dialing tones.

When the user of wireless handset 111 wishes to cancel the call forwarding, the user actuates the call forwarding button a second time. TMA 102 is responsive to this second actuation of the button to transmit the cancel call forwarding message (code number 11) listed in Table 1 to TEA 106. In response to this message, TEA 106 transmits on link 147 the multifrequency dialing tones for string "#21". A talk path is established so that the user of wireless handset 111 can hear the tone response. If a call was already active on analog link 147, TEA 106 first does a flash hook.

Consider the same examples as in the previous paragraphs with the exception that wireless handset 111 is serviced by BRI link 146 rather than analog link 147. TMA 102 is responsive to the message from wireless handset 111 designating that the call forwarding button has been actuated to determine the state of wireless handset 111 with respect to the call forwarding feature. Assuming that the user of wireless handset 111 is actuating the call forwarding feature, TMA 102 sends a CALL primitive to TEA 106. In response, TEA 106 sends a SETUP message for the selected call appearance on BRI link 146 to communication switching system 107. Switching system 107 returns a SETUP$_{13}$ ACK in response, TEA 106 establishes a talk path between wireless handset 111 and a B channel in BRI link 146. Next, TEA 106 returns an ANSWERED CALL primitive to TMA 102. In response to the ANSWERED CALL primitive, TMA 102 utilizes the common protocol to send the call forwarding message listed in Table 1 of FIG. 2 to TEA 104. TMA 102 includes the dialed number for wireless handset 111 in the call forwarding message. Next, TMA 102 sends the telephone number that calls are to be forwarded to using the digits message in Table 1. Communication switching system 107 has been administered for a multibutton BRI station set to be connected to BRI link 146. The administration designates that button 9 on the BRI station set actuates/deaetuates call forwarding. In response to call forwarding message from TMA 102, TEA 104 utilizes a INFO (information) message listed in Table 3 of FIG. 4 to send information to communication switching system 107 that button 9 has been activated. Communication switching system 107 is responsive to the INFO message to transmit back an INFO message of its own designating that the indicator associated with button 9 should be lit. TEA 104 is responsive to this message to send the dialed digits designating the destination telephone to which calls are to be forwarded. The digits are sent to communication switching system 107 utilizing a second INFO message. Communication switching system 107 responds by sending back a INFO message designating that the feature has been actuated. TEA 104 is responsive to this message to transmit the same information in an internal INFO message to TMA 102 using message 219 of FIG. 2. TMA 102 is responsive to the message from TEA 104 to process this message depending on the capabilities of wireless handset 111. If wireless handset 111 has the capability of visually communicating to the user that the call forwarding feature is now activated, TMA 102 transmits to wireless handset 111 the appropriate message to activate this visual indication. If wireless handset 111 does not have the capability of visually indicating the activation of the feature, TMA 102 will request that an internal tone generator of switch node 101 supply a confirmation signal via the talk path maintained by PRI link 148 and base station 108 to wireless handset 111. In a second embodiment, the user of wireless handset 111 would receive no indication that the feature had been activated.

When the user of wireless handset 111 cancels the call forwarding, the user actuates the call forwarding button a second time. TMA 102 is responsive to this second actuation of the call forwarding button to transmit the cancel call forwarding message listed in Table 1 to TEA 104. In response to this message, TEA 104 transmits to communication switching system 107 a INFO message designating that button 9 has been actuated. Communication switching system 107 is responsive to that INFO message to cancel call forwarding and to send an INFO message back to TEA 104 designating that the indicator that normally is associated with button 9 should be turned off. TEA 104 is responsive to this message to transmit an internal INFO message to TMA 102 advising TMA 102 that the call forwarding feature has been canceled. TMA 102 is responsive to this message to request that a confirmation tone be sent to wireless handset 111 utilizing a tone generator within switch node 101 if wireless handset 111 cannot give a visual indication that the call forwarding feature has been canceled. If wireless handset 111 can give a visual indication, TMA 102 sends a message to wireless handset 111 requesting that it activate the visual indication that the call forwarding feature has been canceled. Note, that in the second embodiment, no indication would be given to the user of wireless handset 111 that the call forwarding feature had been canceled.

Table 1 of FIG. 2 illustrates the messages that are used in the common protocol. Message 201, switchover, allows for changing from one call appearance to another for a wireless handset having two call appearances or switching between two calls (one on soft hold) for one call appearance. Message 202, transfer, allows a call to be transferred to a number designated by a dialed destination telephone number. Message 203, conference, allows the user of a wireless telephone to originate a conference call. Message 204, drop, is a request from a TMA to a TEA to drop a telephone call. Message 205, hold, is a message from a TMA to a TEA to place a call on hold. Message 206, retrieve, allows a TMA to retrieve a call that has been placed on hold. Message 207, pickup, actuates a feature whereby a wireless handset actuating the feature can pick up a call tinging on another telephone that is part of a pickup call group with the wireless handset. This message is sent from a TMA to a TEA. Message 208, auto callback, actuates an auto callback feature and is transmitted from a TMA to a TEA. Message 209, call coverage, is also referred to as send all calls and is a feature where a wireless handset actuates the feature to cause all incoming calls to be transferred to the call coverage path for the actuating wireless handset. This feature is canceled by the transmission of the message a second time to a TEA. Message 210, call forwarding, actuates the call forwarding feature and is sent from a TMA to a TEA. Message 211, call forwarding cancel, cancels the call forwarding feature and is sent from a TMA to a TEA. Message 212, digits in message, is used by a TMA to send individual characters or character groups to a TEA. These characters may be received from a wireless telephone or generated internally by the TMA in response to an action of the user on the wireless telephone. Message 213, auto callback cancel, is sent by a TMA to a TEA to cancel the auto callback feature. Messages 214–218 are sent from a TEA to a TMA. Message 214 is used to acknowledge that the requested action has been performed. Message 216 is used to communicate display information. Message 217 indicates that there is an incoming call. Message 218 communicates the fact that communication switching system 107 failed to perform a requested action. Message 219 internal INFO serves the same function as the ISDN INFO message.

In addition to the messages illustrated in Table 1 of FIG. 2, the TMAs and the TEAs use other high level commands that are integral part of the communication between applications. For example, the MAKE_CALL is a common command utilized to originate calls by an application. A second example is the CALL_PROC message that is utilized to indicate a response to the MAKE—CALL. A third example is the ALERT_CALL command that is utilized to inform an application that an alerting condition such as receipt of a call has been processed by the lower software layers. A fourth example is the CONNECT_CALL message that confirms to an application that a call has been completed. A fifth example is the ANSWERED CALL primitive that indicates that a call has been answered. Similarly, other low level ISDN and analog signaling messages have an equivalent high level message. Tables 2 and 3 have not been described since these are standard ISDN messages and are shown only to enhance the description.

Figures 4, 5:
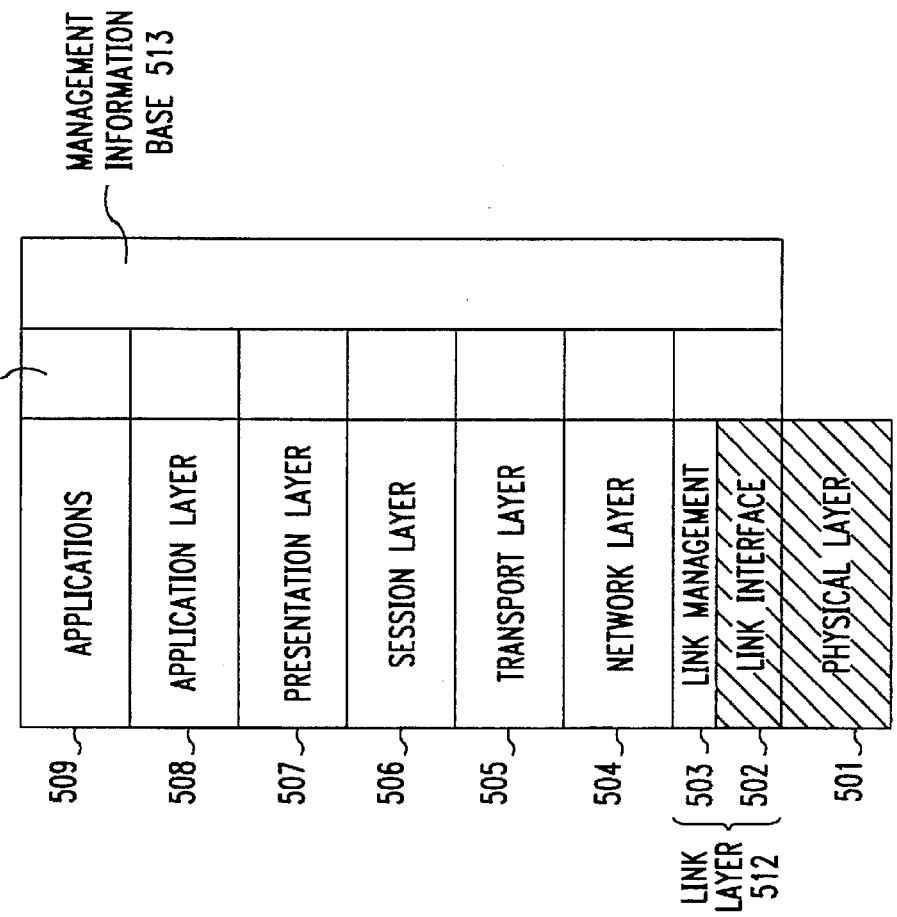

FIG. 5 illustrates the software architecture of the switching nodes of FIG. 1. This architecture is based on the conventional OSI model modified to implement the ISDN protocol. In accordance with the invention as described herein, certain further modifications have been made to the standard model in order to include ISDN capabilities.

The principal function of physical layer 501 is to terminate physical links. Specifically, physical layer 501 is responsible for maintaining physical channels and for controlling physical subchannels thereon. Physical layer 501 comprises a software portion and physical interfaces. Further, the software portion of physical layer 501 is responsible for the direct control of the physical interfaces to which physical links communicating PRI and BRI information terminate. Physical layer 501 presents to link layer 512 physical subchannels and physical channels as entities controllable by link layer 512.

The primary function of link layer 512 is to assure that the information transmitted over a physical channel is recovered intact and in the correct order. This is accomplished using another layer of protocol which allows multiple communication paths—commonly referred to as logical links—to be established on a given physical channel or a physical subchannel communicating packetized data. These logical links are used to identify and process data being communicated between link layer 512 and physical layer 501. (An example of this type of protocol is the LAPD packet protocol used in ISDN Q.921. In the ISDN standard, link layer 512 terminates the LAPD protocol.) Link layer 512 can support multiple protocols so that the upper layers are uneffected by the different protocols being utilized. Further, link layer 512 allows higher software layers to control physical layer 501 in an abstract manner.

As seen in FIG. 5, link layer 512 is divided into link interface 502 and link management 503. The reason for this division is set forth herein below. It will be helpful at this point to discuss the communication of ISDN signals over a D channel to help readers, for example, who have only a rudimentary knowledge of the communication of ISDN signals over a D channel. At link layer 512, a plurality of logical links is established on a D channel. Only one of these logical links communicates ISDN control signals, and this logical link is referred to herein as a logical D channel (LDC). The LDC is identified by a logical D channel number (LDCN).

Link interface 502 does the majority of the functions performed by link layer 512, including the establishment of the logical links. Link management 503 identifies the various link interfaces for higher software layers. Further, link management communicates information between the logical links and higher software layers.

Network layer 504 processes information communicated on the LDCs, and thereby terminates the ISDN Q.931 protocol. Hence, this layer is responsible for negotiating the utilization of system resources for the termination or origination of calls external to a switching node. The network layer controls the allocation of channels on an interface on which a call is being received or set up. For example, if switching node 101 receives a call from switching node 102 via PRI link 150, network layer 504 of switching node 101 negotiates with its peer layer (the corresponding network layer 504 in switching node 102) in order to obtain allocation of a B channel in PRI link 150—a procedure later to be repeated if a second B channel is desired. This negotiation is carried out using standard ISDN Q.931 messages such as the call setup and connection messages via the LDC setup on the D channel of PRI link 150. Network layer 504 identifies all B channels of given interface with the LDC for that interface. Network layer 504 is only concerned with the establishment of a call from one point to another point (e.g., switching node to switching node). The network layer is not concerned with how a call is routed internally to a particular switching node but rather transfers information up to higher layers for the determination of how a call is routed in the switching node. However, the network layer does request that one application, referred to here and below as the connection manager application, add or remove facilities on a physical interface to a switch connection within a switching node.

Specifically, the network layer carries out call setup by first determining that the request for the establishment of a call is valid and that the resources between the two switching systems are available to handle this call. After this determination, information concerning the call is transferred to higher software layers. The reverse is true when the network layer receives a request from the higher software layers to establish a connection with another switching node.

Network layer 504 receives information from another node concerning a call via a LDC. As information is received on the LDC, a call reference number is utilized to identify the call associated with this message. The call reference number is selected by the originating network layer during call setup in acdordance with the ISDN standard. Details of this identification are given with respect to FIG. 14.

Transport layer 505, is the key element that allows the routing of a call through a complex system having multiple nodes as illustrated in FIG. 1. Its primary function is to manage the routing of calls externally, i.e., between switching nodes. Transport layer 505 views the system of FIG. 1 in terms of nodes and is concerned with routing calls from its own node to other nodes or endpoints. (As explained in the detailed discussion of session layer 506, that layer, not transport layer 505, interprets logical destination information, such as a telephone number, to determine the destination node of a call and to establish an intra-node path by using the connection manager application.) In an overall system comprising multiple switching nodes such as switching node 101, the various transport layers communicate with each other in order to establish a call through the various switching nodes. This communication between transport layers is necessary because it may be necessary to route the call through intervening nodes to reach the destination node. The transport layers communicate among themselves utilizing signaling paths (LDCs) established between switching nodes.

With respect to inter-node routing, transport layer 505 is the first layer that starts to take a global view of the overall system illustrated in FIG. 1. Transport layer 505 uses information provided by session layer 506 to select the inter-node path. The transport layer performs its task of routing between various nodes by the utilization of tables defining the available paths and the options on those paths. These tables do not define all paths but only those paths which the node has already used.

Communication between transport layers is done by network layer 504 using established LDCs. Transport layer 505 communicates information destined for its peers to network layer 504, and network layer 504 packages this information within the information elements, IEs, of standard ISDN Q.931 messages. Network layer 504 uses the LDC that has been set up to a particular node to communicate this information to its peer network layer. Similarly, when another network layer receives information of this type, the other network layer unpackages information and then directs the information to the transport layer.

The primary function of session layer 506 is to establish communication among endpoints with all endpoints considered to be applications including, for example, a BRI station set is considered an application. Significantly, these endpoints may be applications such as the application performing the call processing features or the dialing plan application. In any event, connections between such endpoints is considered a call. A session (call) is set up by session layer 506 any time two applications require communication with each other. As noted earlier, session layer 506 deals only in terms of switching nodes and applications on those switching nodes and relies on transport layer 505 to establish paths to other switching nodes. Session layer 506 identifies the called application by an address which previously in the telecommunication art was thought of as only a telephone number but has a much broader concept in the Q.931 protocol. From this address, session layer 506 determines the destination switching node. Session layer 506 sets up a call to the destination switching node by communicating with the session layer of the destination switching node. The communication with the other session layer is accomplished by having the session layer request its transport layer to place a call to the other switching node so that a connection can be made for a particular address. The transport layer places the call relying on the node number that was determined by the session layer. These requests are done using the network layer to generate standard ISDN Q.931 call setup messages. If the other switching node cannot interpret the address, the session layer of that switching node transmits information to its transport layer requesting that the call be dropped. If the session layer can interpret the address, it sends a message to its transport layer requesting that a call proceeding message be transmitted by its network layer back to the requesting switching node.

Presentation layer 507 of FIG. 5 invokes a complex protocol in order to groom the information being communicated between applications so that the applications are totally divorced from the protocol used to communicate the information. A presentation level protocol allows an application to communicate with a peer application across a transport path.

Finally, application layer 508 manages the resources needed by the applications running at software layer 509.

When an application at software layer 509 is communicating with another peer application, the application is unaware of how many other applications exist or where these other applications are located. It is the function of application layer 508 to determine and use such details, consequently allowing the applications to be written in a very abstract manner.

Layer management 511 denotes the various software routines used to communicate messages and to perform operations at the different software layers. Management information base 513 stores information used by the software layers.

Further information on the operation and software structure of layers 501 through 509, layer management 511 and management information base 513 is given in U.S. Pat. No. 5,386,466 that is hereby incorporated by reference.

Figure 6:
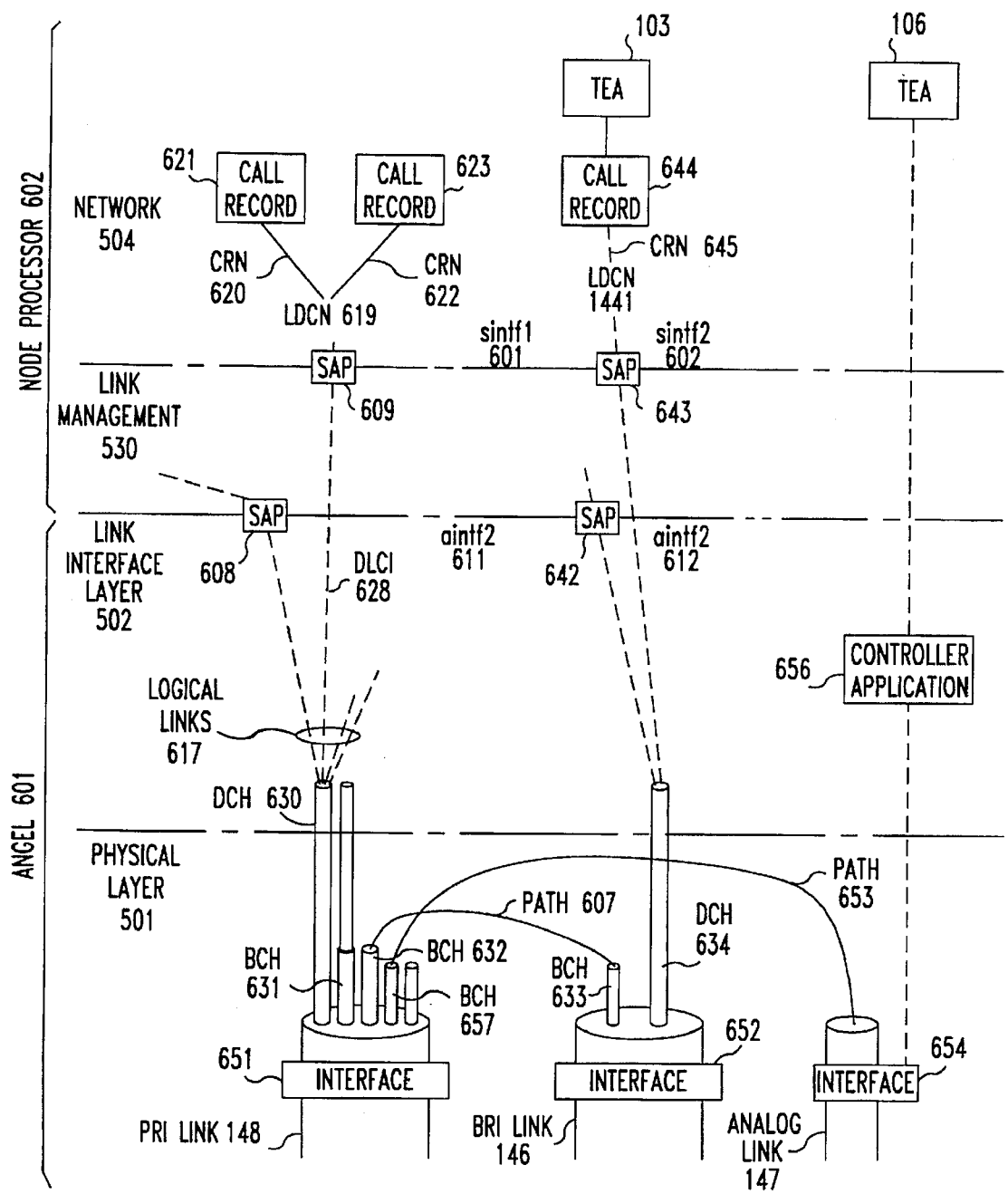
FIG. 6 logically illustrates the signaling and transport paths that are set up within a switch node.

FIG. 6 logically illustrates the general relationships between data link connection identifiers (DLCI), service access point identifiers (SAPI), terminal end identifiers TEI), system interface numbers (sintf), switches angel interface numbers (aintf), logical D channel numbers (LDCN), call reference numbers (CRN), and the various software layers. As illustrated in FIG. 6, the pair of link interface layers and physical layers are implemented on angel 601. (The concept of angels is explained in U.S. Pat. No. 5,386,466. Link interface layer 625 and physical layer 626 are implemented by a local angel. Node processor 601 in switch node 101 implements link management 503, network 504, and higher layers. The node processor provides overall control of switch node 101. Sintf, switch and aintf numbers correlate to physical interfaces and are stored in management information base 512. The sintf numbers are utilized by network software layer 504 and higher software layers to identify physical interfaces. In addition, two switching nodes interconnected by a pair of physical interfaces negotiate a logical interface number for the physical interfaces at initialization of the link. When a transport command is received, network layer 504 converts the logical interface numbers in the bearer capability IEs to sintf's. Network layer 504 views the physical interfaces as being identified by sintf1 601 and sintf2 602. Link management 503 makes a conversion between the sinff numbers and the switch and alnff numbers which together represent the physical interface. For example, link management 503 converts sinffl 601 to the local angel and aintf 611. Link interface layer 625 utilizes aintf 611 to identify physical interface 651. There is a one for one correspondence between sintf1 601 and sintf2 602 and aintf1 611 and aintf2 612.

The sinff and aintf numbers identify specific interfaces, and each interface has a number of channels. For example, PRI interfaces 651 and 652 each have 24 channels. Network layer 504 identifies the channels associated with a particular sintf by using the actual physical channel numbers, and similarly, link interface layer 625 utilizes the physical channel numbers in association with an aintf number. This is possible because the specifications of the ISDN standard designate that physical channel 24 is used to perform signaling. Network layer 504 and higher layers utilize sintf numbers in order to control the link interface layers and physical layers to interconnect physical channels and to create specific protocols on these channels. The manner in which B channels are interconnected through physical networks such as network 615 is not illustrated in FIG. 6 except in a logical manner, e.g. path 607 and path 653.

Further, FIG. 6 logically illustrates the utilization of the various channels and the points at which these channels are terminated and at which information is utilized. B channel 632 of interface 651 is interconnected to B channel 633 of interface 652 by path 607. Path 607 is made through a network internal to a switch node. Path 653 is made in a similar manner. It would be obvious to one skilled in the art that similar paths could be made between other B channels in interface 651 and 652. The circuit switching of B channels is performed at the physical layer; whereas, packet switching or frame relaying is performed at the link interface layer. Greater detail on operations of the FIG. 6 in setting up a call are set forth in U.S. Pat. No. 5,386,466.

FIG. 6 illustrates that analog interface 654 is directly controlled by controller application 656. Controller application 656 is executing on angel 601 and communicates directly with TEA 106 via messages transmitted at the application level. TEA 106 maintains a table that correlates the directory number of the wireless telephone serviced by analog link 147 to the physical identification number for interface 654. TEA 106 and controller application 656 identify communications concerning analog link 147 by reference to this physical identification number. Interface 654 is only controlling analog link 147. Controller application 656 is responsible for controlling the internal network of switch node 101 and is part of layer management 511.

Figure 7:
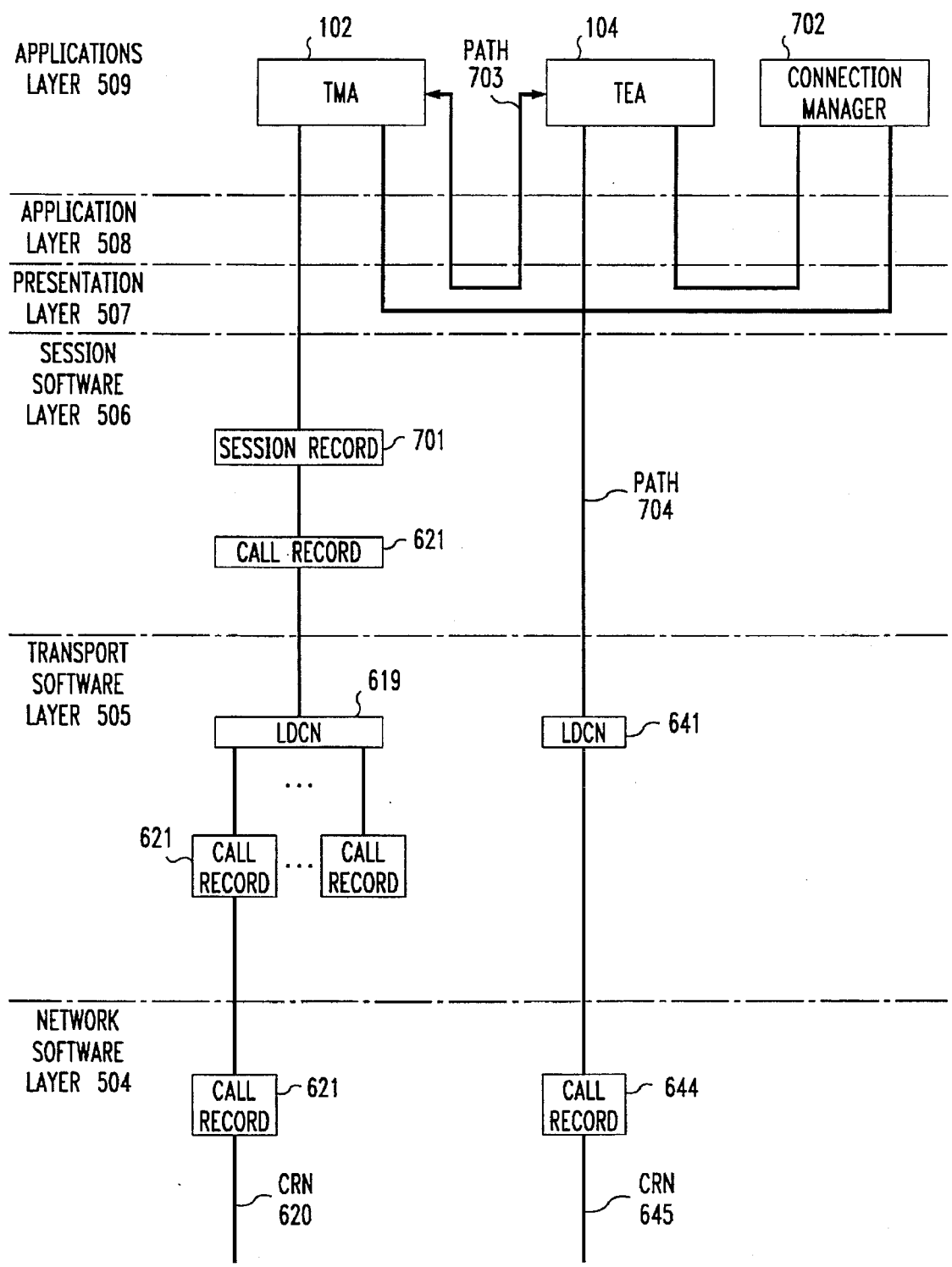
FIG. 7 illustrates the logical structure of a call within a switch node when the wireless handset is serviced by a BRI link.
Figure 8:
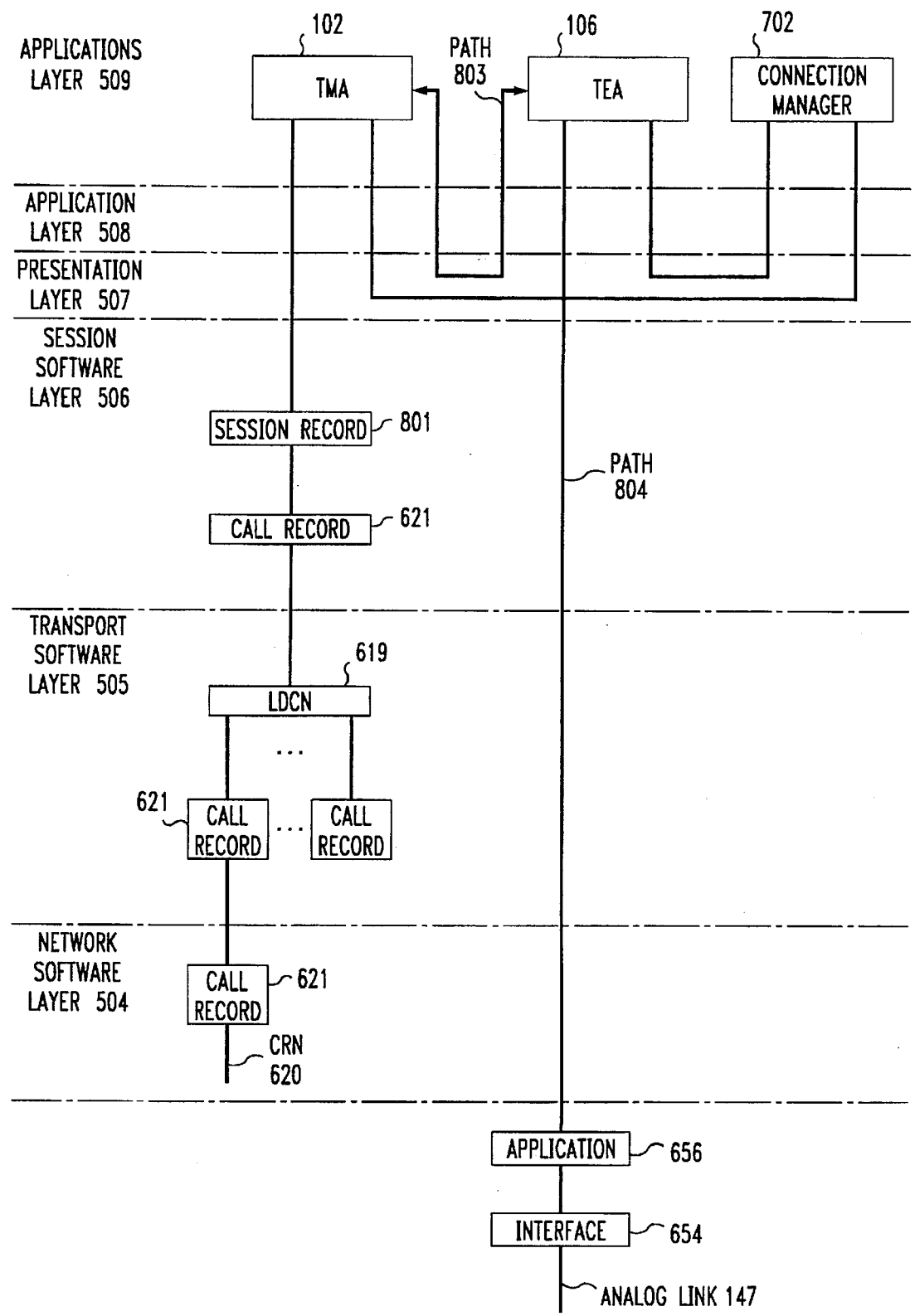
FIG. 8 illustrates the logical structure of a call through a switch node when the wireless handset is serviced by an analog telephone link.

FIGS. 7 and 8 illustrate how calls are processed through the software layers illustrated in FIG. 5. FIG. 7 illustrates the case where a TEA is servicing a BRI link. Note, that most proprietary digital protocols used by different manufacturers would be handled in a manner similar to that illustrated in FIG. 7. FIG. 8 illustrates the case where a TEA is servicing an analog link. With reference to FIG. 7, when the user of wireless handset 111 actuates the transmit button on the handset, base station 108 is responsive to this actuation to transmit a call setup message to TMA 102 via PRI link 148. When the setup message is received, network software layer 504 establishes call record 621 and assigns call reference number 620 to the call. Transport software layer 505 is responsive to the call to identify this call with LDCN 619 which has already been established for PRI link 148. The destination of the setup message is specified as TMA 102. Base station 108 knows the identity of the TMA that is to service wireless handset 111. Session software layer 506 is responsive to the call setup message to establish session record 701. For a normal call, session software layer 506 would establish the second half of the call to transport layer 505. However, since the call's destination is TMA 102, session software layer 506 routes the call to TMA 102. TMA 102 is responsive to the call and the directory number of wireless handset 111 to determine from a table stored in management information base 512 that handset 111 is serviced by TEA 104. TMA 102 transmits a MAKE—CALL message to TEA 104 via path 703. The message includes the directory number of wireless handset 111. After the user of wireless handset 111 has dialed the destination telephone number, TMA 102 communicates the destination directory, number to TEA 104 utilizing the digit message from Table 1 of FIG. 2.

TEA 104 is responsive to the directory number of wireless handset 111 to determine that BRI link 146 is utilized to service wireless handset 111. Since TEA 104 knows the identity of BRI link 146, the normal functions performed by session software layer 506 and transport software layer 505 are not necessary. The principal function performed by session software 506 is to communicate control messages between the two halves of the call. This operation is described in greater detail in U.S. Pat. No. 5,386,466. However, TEA 104 communicates the control information from the right half of the call directly to TMA 102. For these reasons, TEA 104 establishes path 704 directly to network software layer 504 using only LDCN 641 in transport software layer 505 to identify the control channel of BRI link 146. TEA 104 requests via path 704 that network software layer 504 transmit a setup message to communication switching system 107 on BRI link 146. Network software layer 504 is responsive to this request to establish call record 644 and CRN 645. Network software layer 504 then transmits the setup message via layers 501 and 512. The setup message includes the directory number for the destination telephone. Communication switching system 107 is responsive to the setup message to complete the call to the destination telephone. Once the destination telephone system is receiving tinging, communication switching system 107 transmits an alert message to switch node 101 on control path 118. Network software layer 504 of FIG. 7 is responsive to this alerting message to determine that the message should be forwarded to TEA 104. Similarly, when the connect message is received from communication switching system 107, TEA 104 requests that connection manager 702 establish a connection for the call between BRI link 146 and the B channel of PRI link 148. During the alerting, TMA 102 may provide auto alerting information to wireless handset 111.

Consider now how a call is placed to wireless handset 111. When a call for wireless handset 111 is received by communication switching system 107, the system examines internal tables and determines that the call should be directed to a telephone connected to BRI link 146. Communication switching system then sends and expects to receive the normal BRI messages to and from a BRI station set. As the BRI messages from communication switching system 107 are received by network software layer 504 of FIG. 7, these messages are relayed to TEA 104. In response to the setup message from communication switching system 107, TEA 104 responds back with an alerting message. In addition, TEA 104 transmits via path 703 a MAKE__CALL message to TMA 102. This message includes the directory number of wireless handset 111. TMA 102 is responsive to the message to request that session software layer 506 establish a call to the directory number. Session software layer 506 establishes session record 701 and call record 621 and transfers the request to transport software layer 504. Transport software layer 504 is responsive to the directory number to determine that that number can be reached using LDCN 619 and transfers a request to network software layer 504 to establish a call on a B channel of PRI link 148. Network software layer 504 then sets up CRN 620. When base station 108 receives the setup message, it responds with an alerting message which is transferred back to TMA 102 which communicates the alerting message via path 703 to TEA 104. TEA 104 then requests that network software layer 504 transmit an alerting message on path 118 of BRI link 146 to communication switching system 107. TEA 104 requests the transmission of this message on path 704.

Also in response to the setup message, base station 108 alerts wireless handset 111 over the air interface link. When the user of wireless handset 111 answers the call, base station 108 transmits a connect message to network software layer 504 of FIG. 7. This connect message is then transferred through the intervening software layer to TMA 102. In response to the connect message, TMA 102 requests that connection manager 702 establish a call between the B channel of BRI link 148 and the B channel of BRI link 146 for a voice path. On FIG. 6, this path is path 607 that interconnects B channel 632 of PRI link 148 and B channel 633 of BRI link 146. TMA 102 then transfers the connect message to TEA 104 which relays the connect message to communication switching system 107 via path 704, network software layer 504, and path 118 of BRI link 146.

Consider now when a call is placed from wireless handset 111 to a telephone connected to communication switching system 107. When the user of wireless handset 111 actuates the transmit button and dials a destination directory telephone number, base station 108 sends a setup message to switch node 101 via path 116 of PRI 148. Network software layer 504 is responsive to this setup message to establish call record 621 and to assign CRN 620 to this incoming call. Network software layer 504 then communicates a high level setup message to transport software layer 505. Transport software layer 505 associates the setup message with LDCN 619 and determines from the directory number for wireless handset 111, which is also communicated in the setup message, that the call is to be directed to TMA 102. Session software layer 506 establishes session record 701 and communicates the high level setup message to TMA 102. TMA 102 is responsive to the directory telephone number of wireless handset 111 to determine that TEA 104 services that directory number. Consequently, TMA 102 sends a high level setup message via path 703 to TEA 104. From the telephone directory number of wireless handset 111, TEA 104 determines that this number is associated with BRI link 146. TEA 104 transmits a high level setup message to transport software layer 505 via path 704. Transport software layer 504 is responsive to this high level setup message to associate it with LDCN 641 and to communicate the setup message to network software layer 504 designating that call record 644 should be utilized. Network software layer 504 is responsive to the high level setup message to transmit a setup message to communication switching system 107 via path 119 of BRI link 146.

Communication switching system 107 is responsive to the setup message to return an alerting message to network software layer 504 of switch node 101. Network software layer 504 is responsive to the alerting message to communicate a high level alerting message to TEA 104. The latter TEA communicates the high level alerting message to TMA 102. TMA 102 then sends an alerting message back to base station 108. Note, that if wireless handset 111 is a simple handset and does not have a digital display, TMA 102 will request that connection manager 702 make a connection to a tone source to provide wireless handset 111 with ringback. If wireless handset 111 does have a display and is a more complicated wireless handset, base station 108 transmits a message to wireless handset 111 to activate alerting.

When the destination telephone on communication switching system 107 answers the call, communication switching system 107 transmits a connection message to switch node 101 via path 118 of BRI link 146. Network software layer 504 of FIG. 7 is responsive to the connection message to communicate a high level connection message to TEA 104. TEA 104 requests that connection manager 702 establish a voice connection through the internal switch network of switch node 101 to interconnect wireless handset 111 to a B channel on BRI link 146. In addition, TEA 104 communicates the high level connection message to TMA 102 which transfers this message to wireless handset 111 via the software layers illustrated for the left half of the call of FIG. 7, a B channel of PRI link 148, and base station 108.

Consider now the operations of the different software layers with respect to an analog link serving wireless handset 111 as illustrated in FIG. 8. As illustrated in FIG. 6, controller application 556, that is executed by angel 601 directly controls analog interface 654 that terminates analog link 147. With respect to an incoming call from communication switching system 107, interface 654 detects the tinging on analog link 147. Controller application 656 is responsive to the tinging on interface 654 to transmit a high level setup message to TEA 106 via path 804. TEA 106 determines from an internal table that interface 654 is served by a directory number associated with TMA 102. TEA 106 transmits a high level setup message to TMA 102 via path 803 to inform TMA 102 that a call is being received on interface 654. TMA 102 sends a setup message to session software layer 506 which sets up session record 801 and obtains a new call record which is once again call record 621. Transport software layer 505 is responsive to the setup message to determine that the directory number specifies wireless handset 111 on base station 108. Based on this information, transport software layer 505 chooses LDCN 619 and requests that network software layer 504 send a setup message to base station 108. Network software layer 504 negotiates CRN 620 with base station 108 and transmits the setup message. Base station 108 responds with an alerting message to network software layer 504. Network software layer 504 then communicates the alerting message to TMA 102. In response to the alerting message, TMA 102 sends a high level alerting signal to TEA 106 via path 803. TEA 106 requests that connection manager 702 connect analog link 147 to an internal tone generator so that analog link 147 can receive ringback.

When the user of wireless handset 111 answers the call, base station 108 transmits to network software layer 504 a connect message. In response, network software layer 504 sends a high level connect message to TMA 102. The latter communicates the high level connect message to TEA 106 via path 803. In response to the connect message, TEA 106 transmits a message to controller application 656 to go off hook on interface 654. In addition, TEA 106 requests that connection manager 702 connect analog link 147 to a B channel that had been negotiated by network software layer 504 with its peer in base station 108. In FIG. 6, B channel 657 is connected to analog link 147 via path 653.

Consider now a call originated by wireless handset 111 to a telephone connected to telephone switching network 110. When the user of wireless handset 111 actuates the send button and dials a destination directory telephone number, base station 108 sends a setup message to switch node 101 via path 116 of PRI 148. Network software layer 504 is responsive to this setup message to establish call record 621 and to assign CRN 620 to this incoming call. Network software layer 504 then communicates the setup message to transport software layer 505. Transport software layer 505 associates the setup message with LDCN 619 and determines from the directory number for wireless handset 111, which was also communicated in the setup message, that the call is to be directed to TMA 102. Session software layer 506 establishes session record 801 and communicates the high level setup message to TMA 102. TMA 102 is responsive to the directory telephone number of wireless handset 111 to determine that TEA 106 services that directory number. Consequently, TMA 102 sends a high level setup message via path 803 to TEA 106. From the telephone directory number of wireless handset 111, TEA 106 determines that this number is associated with analog link 147. TEA 106 sends a message via path 804 to controller application 656. In response to the message, controller application 656 goes off hook on interface 654. TEA 106 sends a request to connection manager 702 to connect analog link 147 to a dial tone detector. When the dial tone detector detects a dial tone, TEA 106 transmits the destination directory telephone number to application 656 which implements either touch tone or rotary dialing on interface 654. Then, TEA 106 requests that connection manager 702 establish a path through switch node 101 to B channel 657 which is once again assumed to be the B channel in PRI link 148 and analog link 147. This connection is shown as path 653 in FIG. 6.

Figure 9:
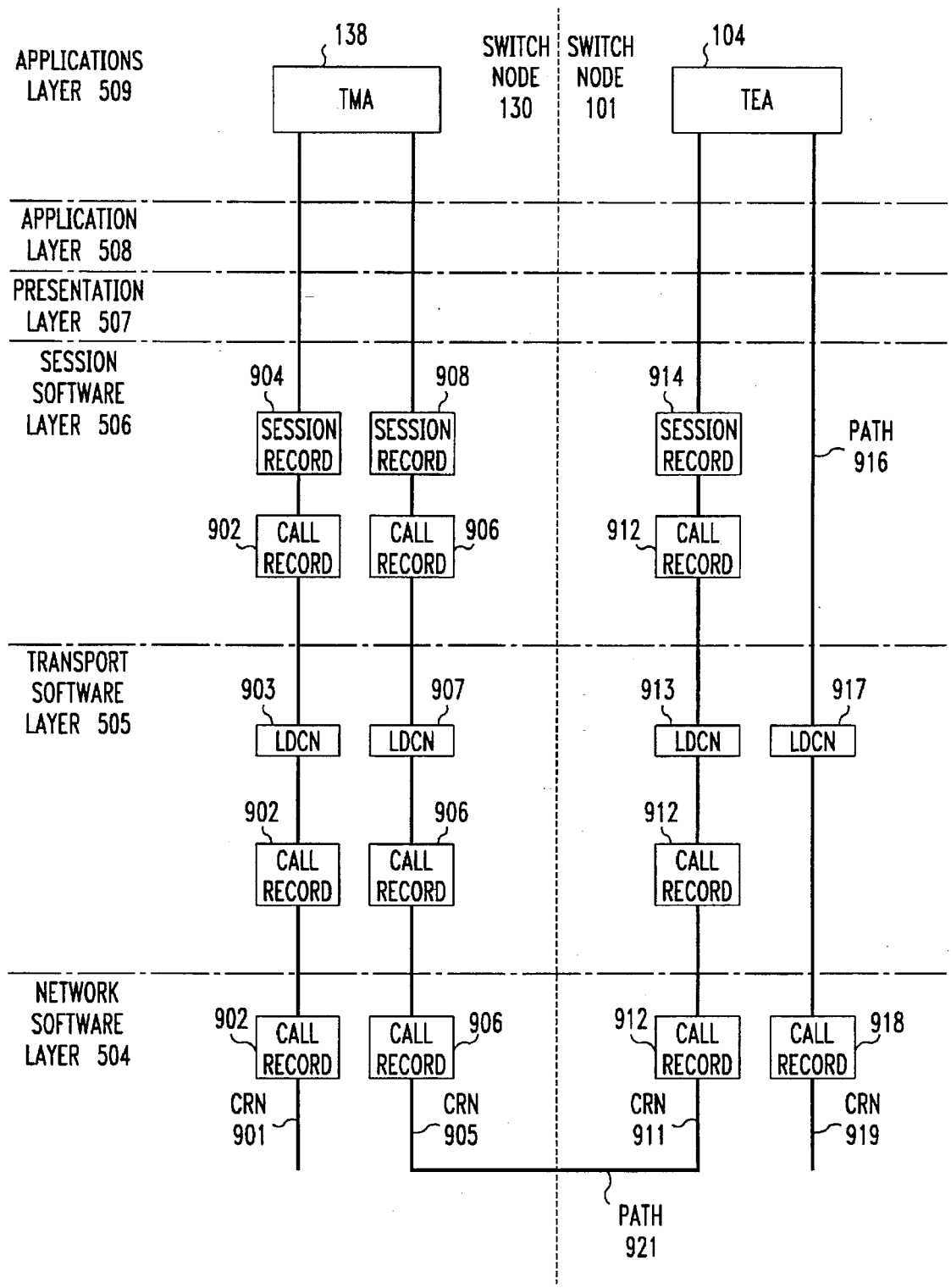
FIG. 9 illustrates the logical structure of a call through two switch nodes when the wireless handset is serviced by a BRI link.
Figure 10:
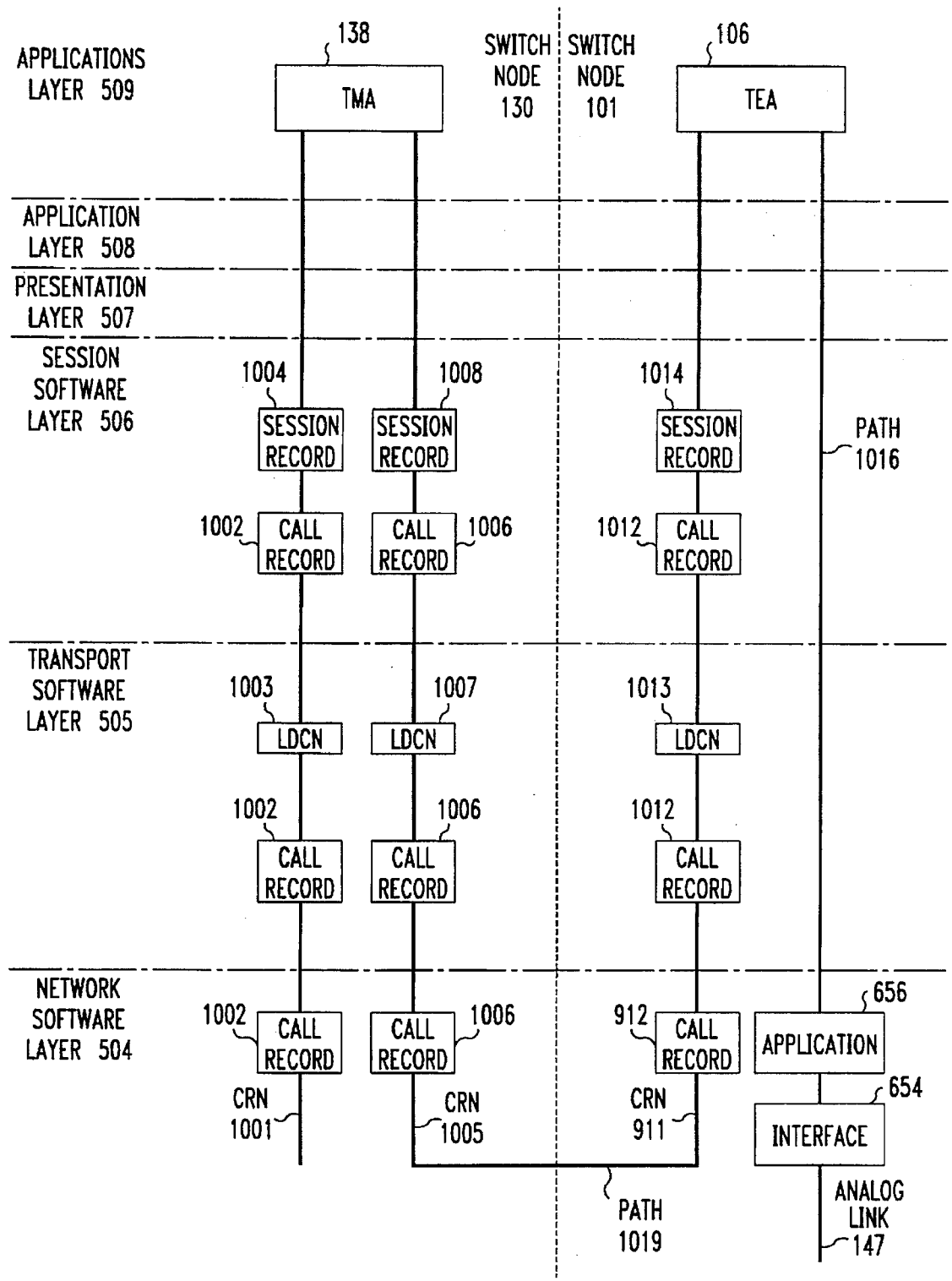
FIG. 10 illustrates the logical structure of a call through two switch nodes when the wireless handset is serviced by an analog link.

FIGS. 9 and 10 illustrate the processing of calls through the software layers illustrated in FIG. 5 where the wireless handset communicates with a base station interconnected to switch node 130 of FIG. 1. The TMA used for the call is in switch node 130 and the TEA used for the call is in switch node 101. FIG. 9 illustrates the case where a TEA is servicing a BRI link, and FIG. 10 illustrates the case where a TEA is servicing an analog link. With reference to FIG. 9, when the user of wireless handset 131 actuates the transmit button on the handset, base station 136 is responsive to this actuation to transmit a call setup message to TMA 138 via PRI link 152. When the setup message is received, network software layer 504 establishes call record 902 and assigns call reference number 901 to the call. Transport layer 505 is responsive to the call to identify this call with LDCN 903 that has already been established for PRI link 148. The destination of the setup message is specified as TMA 138. Base station 136 knows the identity of the TMA that is to service wireless handset 131. Session software layer 506 is responsive to the call setup message to establish session record 904. TMA 138 is responsive to the call and the directory number of wireless handset 131 to determine from a table stored in management information base 512 that handset 131 is serviced by TEA 104. TMA 138 then requests that a call be established on PRI link 151 to switch node 101. Session software layer 506 is responsive to this request to establish session record 908 and call record 906. Transport software layer 505 is responsive to the call setup request to identify this call with LDCN 907 which has already been established on PRI link 151. Network software layer 504 is responsive to the request to negotiate with the network software layer 504 in switch node 101 for a B channel in PRI link 151 and the network software layer in switch node 130 assigns CRN 912 to the call and the network software layer in switch node 101 assigns CRN 911 to the call. Path 921 illustrated in FIG. 9 is the signaling path that is established on the D channel of PRI link 151. A voice path is established for this call on PRI link 151 is not illustrated in FIG. 9. The software layers in switch node 101 respond to this incoming call to establish elements 911 through 914 as was performed with respect to FIG. 7. TMA 138 and TEA 104 communicate the same messages over path 921 that were communicated over path 703. Elements 1001 through 1016 perform the same operations as their equivalents in FIG. 9.

Figure 11:
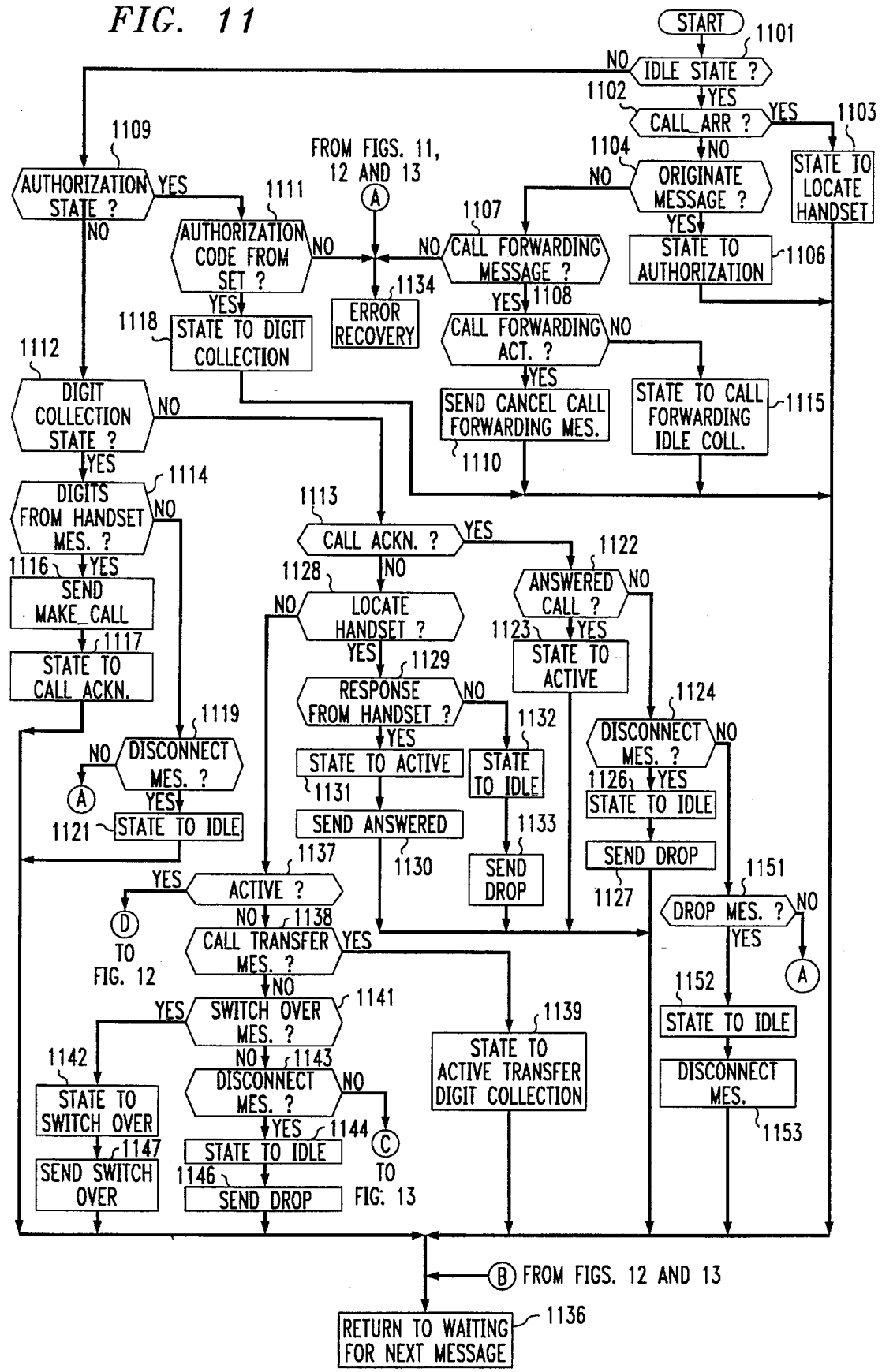
FIGS. 11 through 15 illustrate, in flow chart form, programs for controlling a switch node.
Figure 12:
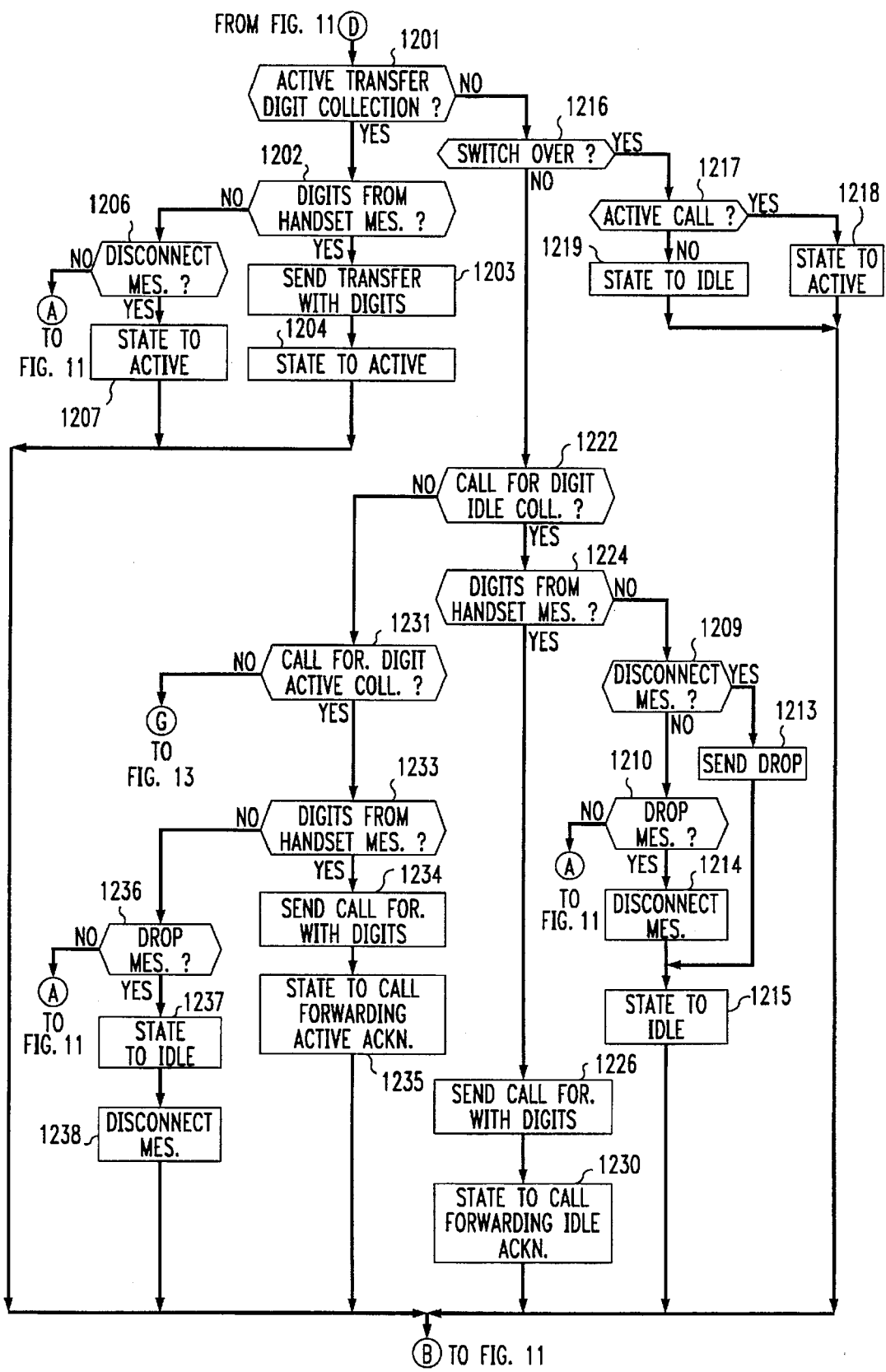
Figure 13:
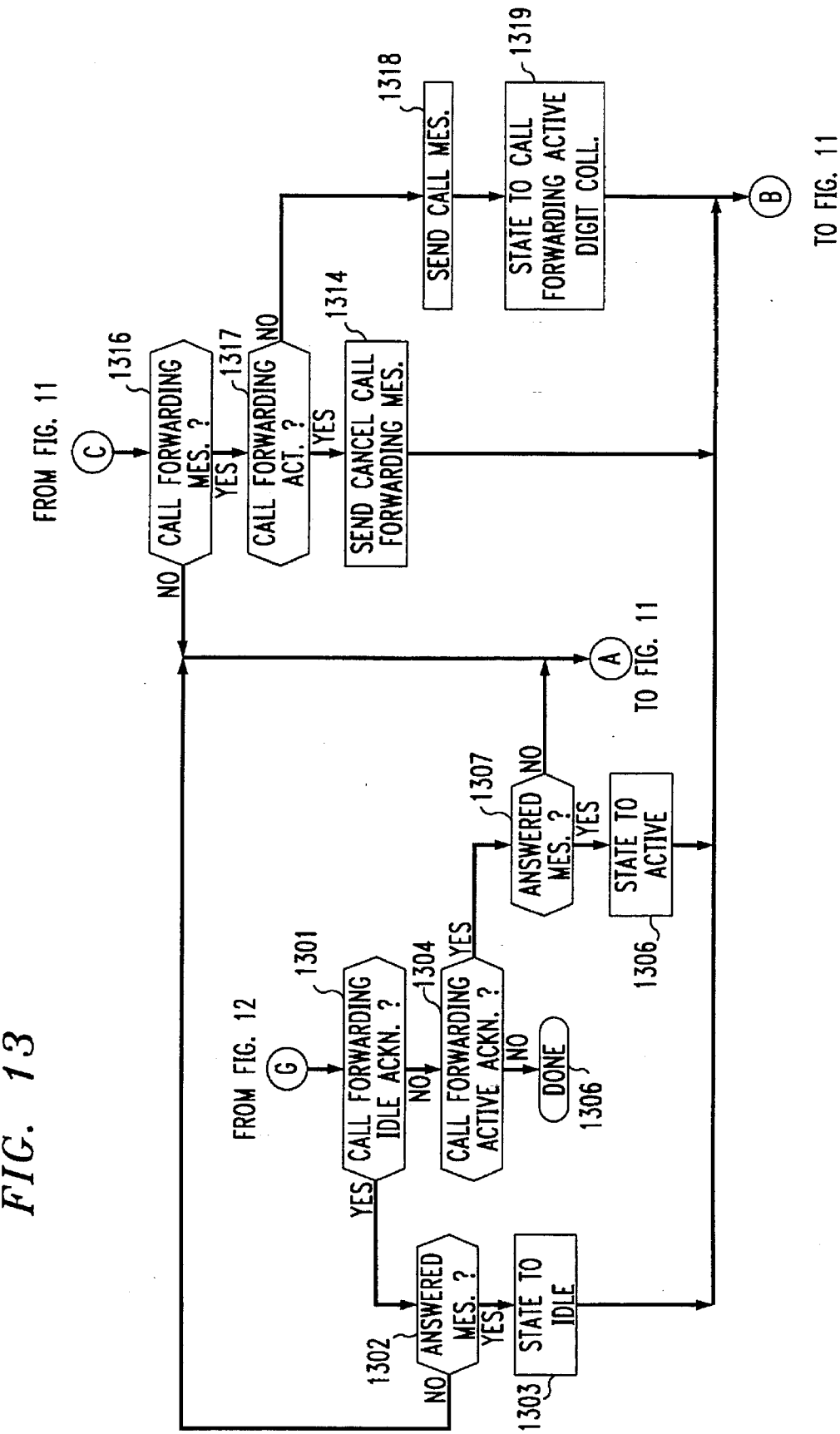

FIGS. 11, 12 and 13 illustrate, in flow chart form, the operations performed by a TMA. It is assumed that the TMA is controlling a wireless handset which has the capability of displaying information and utilizing button pushes to invoke features. One skilled in the art could readily envision how the flow charts of FIGS. 11, 12 and 13 could be modified to allow the control of a simple handset which utilized switch hook flashes and the dialing of special digits to invoke features. Decision block 1101 of FIG. 11 determines whether the handset is in the idle state. If the answer is yes, control is transferred to decision block 1102 which determines if a CALL_ARR message was received from the TEA controlling the telephone link assigned to the wireless handset. If the answer is yes in decision block 1102 indicating that an incoming call has been detected by the TEA, control is transferred to block 1103 which places the state into the locate handset state and actuates the procedure for locating the handset via the appropriate base station. Note, that connector B transfers control to block 1136 that waits for the next message from either the wireless handset or the TEA. Returning to decision block 1102, if the answer is no, decision block 1104 determines if an originate message was received from the wireless handset. The originate message indicates that the wireless handset is making a call. If an origination message was received, control is transferred to block 1106 which requests the authorization information from the wireless handset and places the wireless handset in the authorization state. Returning to decision block 1104, if the answer is no, decision block 1107 determines if a call forwarding message was received from the handset. If the answer is yes, decision block 1108 determines whether call forwarding is presently active. If the answer is yes, decision block 1110 sends the cancel call forwarding message to the TEA. Returning to decision block 1108, if the answer is no, control is transferred to block 1115 which sets the state to call forwarding idle digit collection.

Returning to decision block 1101, if the answer is no, control is transferred to decision block 1109 which determines if the handset is in the authorization state. If the answer is yes, decision block 1111 determines if the authorization code has been received from the set. If the answer is no, error recovery is performed by block 1134. If the answer in decision block 1111 is yes, block 1118 sets the state to digit collection.

Returning to decision block 1109, if the handset is not in the authorization state, decision block 1112 determines if the handset is in the digit collection state. In this state, the TMA is waiting for the user of the wireless handset to dial the destination telephone number. If the answer in decision block 1112 is yes, control is transferred to decision block 1114. The latter decision block determines if the destination telephone number digits have been received from the handset. If the answer is yes, block 1116 sends a MAKE_CALL request to the TEA and also transmits the destination telephone digits. Block 1117 then sets the state to call acknowledgment. Returning to decision block 1114, if the answer is no, control is transferred to decision block 1119 which checks to see if a disconnect message was received from the station set. If the answer is yes, block 1121 sets the state to idle. Note, if the answer in decision block 1119 is no, error recovery is performed by block 1134.

Returning to decision block 1112, if the answer is no, control is transferred to decision block 1113 which determines if the handset is in the call acknowledgment state. If the answer is yes, decision block 1122 determines if an answered call message has been received from the TEA. If the answer is yes, block 1123 sets the state to active. If the answer in 1122 is no, decision block 1124 determines if a disconnect message was received from the handset. If the answer is yes, block 1126 changes the state to idle, and block 1127 transmits the DROP message to the TEA. Returning to decision block 1124, if the answer is no, decision block 1151 determines if a DROP message was received from the TEA. If the answer is yes, block 1152 sets the state to idle and block 1153 transmits a disconnect message to the wireless handset. Returning to decision block 1122, if the answer is yes that an ANSWERED CALL message was received from the TEA, block 1123 sets the state to active.

Returning to decision block 1113, if the answer is no, decision block 1128 determines if the handset is in the locate handset state. If the answer is yes, decision block 1129 determines if a response has been obtained from the handset within a reasonable mount of time. If the answer is no, block 1132 sets the state to idle and 1133 sends a drop message to the TEA. If the response in decision block 1129 is yes, block 1131 sets the state to active, and block 1130 sends an ANSWERED message to the TEA.

Returning to decision block 1128, if the answer is no, decision block 1137 determines if the handset is in the active state. If the answer is no, control is transferred to block 1201 of FIG. 12. If the answer is yes, decision block 1138 determines if a call transfer message has been received from the handset. If the answer is yes, block 1139 sets the state to active transfer digit collection. Returning to decision block 1138, if the answer is no, decision block 1141 determines if a switchover message was received from the handset. If the answer is yes, block 1142 sets the state to switchover, and block 1147 sends the switchover message to the TEA. Returning to decision block 1141, if the answer is no, decision block 1143 determines if a disconnect message was received from the handset. If the answer is yes, block 1144 sets the state to idle, and block 1146 sends a DROP message to the TEA to have the TEA disconnect the call with communication switching system 107. If the answer in decision block 1143 is no, control is transferred to block 1316 of FIG. 13.

If the answer in decision block 1137 of FIG. 11 is no, control is transferred to decision block 1201 of FIG. 12. Decision block 1201 determines if the handset is in the active transfer digit collection state. If the answer is yes, decision block 1202 determines if the digits have been received from the wireless handset to designate the telephone to which incoming calls are to be transferred. If the answer is yes, block 1203 sends the transfer message along with the digits to the TEA, and block 1204 sets the state to active. Returning to decision block 1202, if the answer is no, decision block 1206 determines if a disconnect message has been received from the wireless handset. If the answer is yes, block 1207 sets the state to idle, and block 1208 transmits a drop message to the TEA.

Returning to decision block 1201, if the answer is no, control is transferred to decision block 1216. The latter decision block determines if the state is switchover. If the answer is yes, decision block 1217 determines if there is an active call. If the answer is yes, block 1218 sets the state to active. If the answer is no, block 1219 sets the state to idle.

Returning to decision block 1216, if the answer is no, decision block 1222 determines if the state is call forwarding digit idle collection state. If the answer is yes, control is transferred to decision block 1224 which determines if the necessary digits have been received from the handset. If the answer is yes, block 1226 sends a transfer message with the digits to the TEA, and block 1230 sets the state to call forwarding idle acknowledgment. If the answer is no in decision block 1224, control is transferred to decision block 1209 that determines if a disconnect message had been received from the wireless handset. If a disconnect message has been received, block 1213 sends a drop message to the TEA, and block 1215 sets the state to idle. If the answer is no in decision block 1209, decision block 1210 determines if a drop message has been received from the TEA. If the answer is yes, block 1214 sends a disconnect message to the wireless handset, and block 1215 sets the state to idle. If the answer is no in decision block 1210, error recovery is performed.

Returning to decision block 1222, if the answer is no, decision block 1231 determines if the state is call forwarding digit active collection. If the answer is yes, decision block 1233 determines if the correct number of digits have been received from the handset. If the answer is yes, a call forwarding message and the digits are sent to the TEA. If the answer is no in decision block 1233, decision block 1236 determines if a drop call message had been received from the TEA. If the answer is yes, block 1237 sets the state to idle, and block 1238 sends the disconnect message to the wireless handset. If the answer in decision block 1231 is no, control is transferred to block 1301 of FIG. 13.

Decision block 1301 of FIG. 13 determines if the handset is in the call forwarding idle acknowledgment state. If the answer is yes, decision block 1302 determines if an ANSWERED message has been received from the TEA. If the answer is yes, block 1303 sets the state to idle. Returning to decision block 1301, if the answer is no, decision block 1304 determines if the state is call forwarding active acknowledgment state. If the answer is yes, control is transferred to decision block 1307 which determines if an ANSWERED message has been received from the TEA. If the answer is yes, block 1308 sets the state to active.

Returning to decision block 1143 of FIG. 11, if the answer is no, control is transferred to decision block 1316 of FIG. 13. The latter decision block determines if the call forwarding message was received from the wireless handset. If the answer is yes, block 1317 determines if call forwarding is active. If the answer is yes, block 1314 sends the cancel call forwarding message to the TEA. Returning to decision block 1317, if the answer is no, block 1318 sends a MAKE—CALL message to the TEA, and block 1319 sets the state to call forwarding active digit collection.

Figure 14:
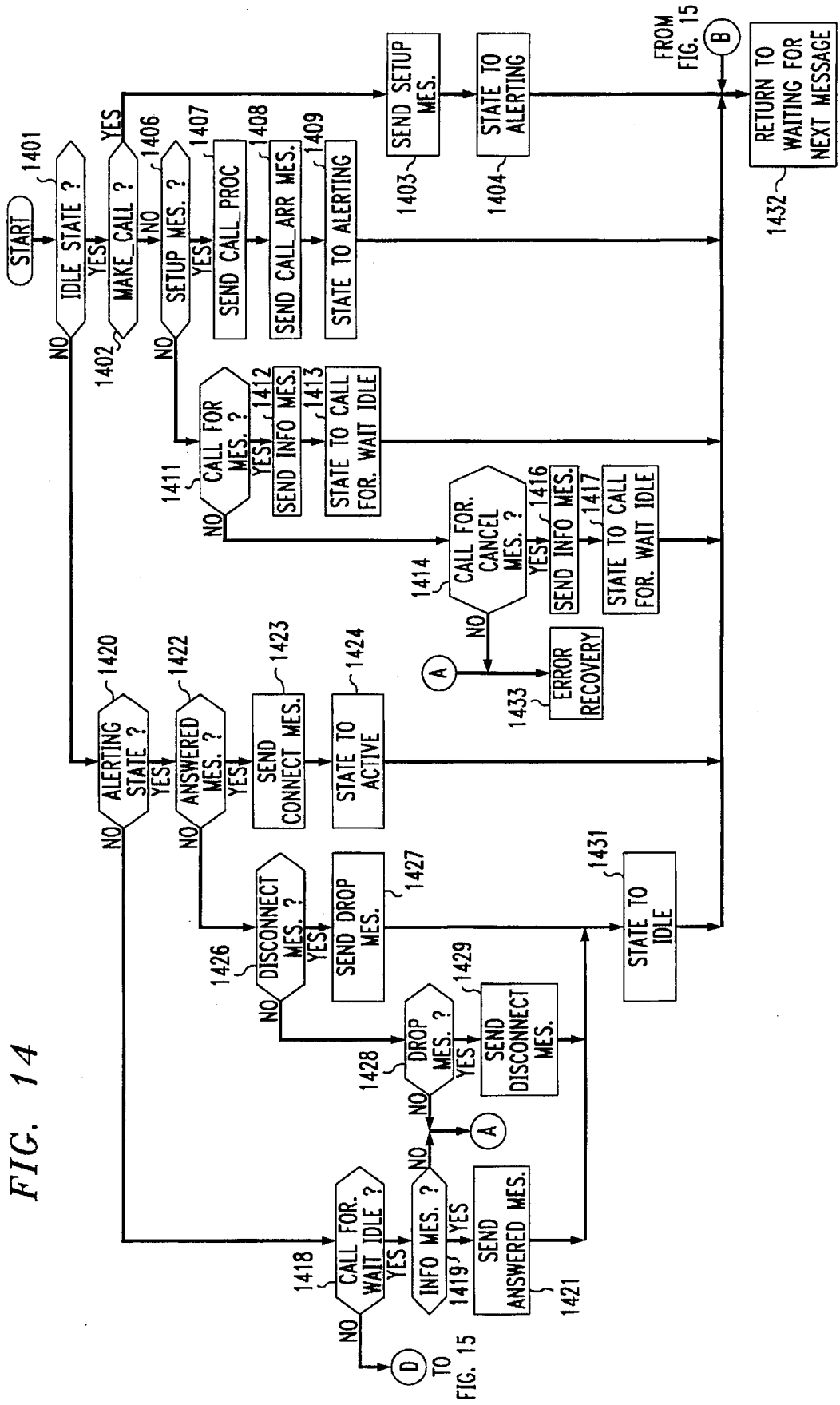
Figure 15:
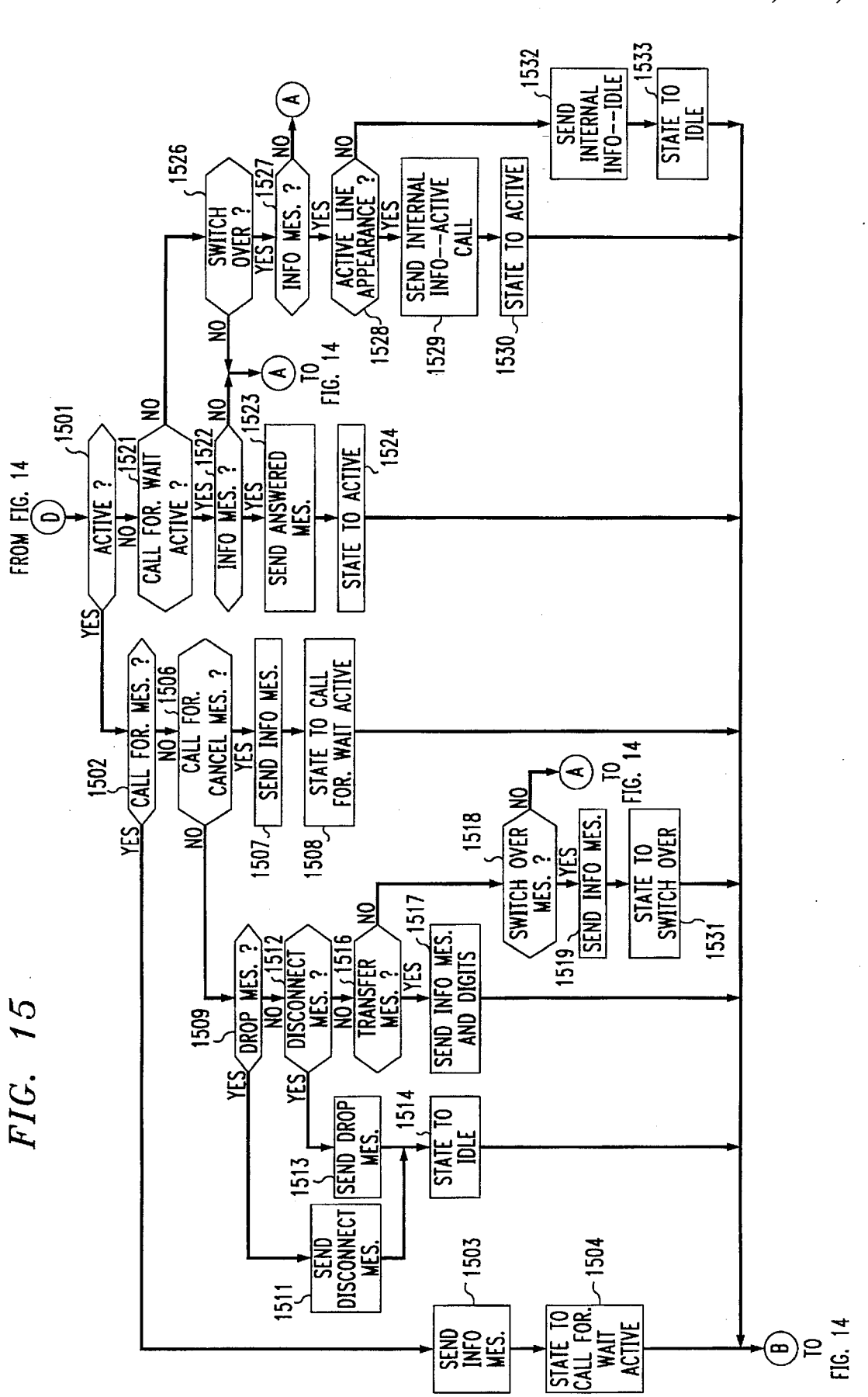

FIGS. 14 and 15 illustrate, in block diagram form, the functions performed by a TEA that is controlling a BRI link. One skilled in the art could readily envision the changes that would be necessary to FIGS. 14 and 15 to perform the functions of a TEA controlling an analog telephone link. Upon the detection of a message either from a TMA or communication switching system 107, decision block 1401 determines if the state is the idle state. If the answer is yes, decision block 1402 determines if the message is a MAKE— CALL message from a TMA. If the answer is yes in decision block 1402, block 1403 transmits a setup message to communication switching system 107, and block 1404 changes the state to alerting.

Returning to decision block 1402, if the answer is no, decision block 1406 determines if a setup message was received from communication switching system 107. If the answer is yes, block 1407 sends a CALL—PROC message to communication switching system 107. Next, block 1408 transmits the CALL—ARR message to the appropriate TMA, and block 1409 changes the state to the alerting state. If the answer in decision block 1406 is no, decision block 1411 determines if a call forwarding message was received from a TMA. If the answer is yes, block 1412 transmits an INFO message to communication switching system 107. The INFO message specifies that the call forwarding button has been actuated on a station set that communication switching system 107 believes to be connected to the BRI link. Finally, block 1413 sets the state to call forwarding wait idle. Returning to decision block 1411, decision block 1414 determines if a call forwarding cancel message was received from a TMA. If the answer is no, control is transferred to block 1433 for error recovery. If the answer is yes, block 1416 sends an INFO message to communication switching system 107 indicating that the call forwarding is being canceled. Block 1417 then sets the state to call forwarding wait idle.

Returning to decision block 1401, if the answer is no, decision block 1420 determines if the state is the alerting state. If the answer is yes, decision block 1422 determines if an ANSWERED message has been received from the TMA. An ANSWERED message indicates that the wireless handset has answered the telephone. If the answer in decision block 1422 is yes, block 1423 sends a CONNECT message to communication switching system 107, and block 1424 sets the state to active. Returning to decision block 1422, if the answer is no, decision block 1426 determines if a DISCONNECT message was received from communication switching system 107. If the answer is yes, block 1427 sends a DROP message to the TMA, and block 1431 sets the state to idle. If the answer in decision block 1426 is no, decision block 1428 determines if a DROP message was received from the TMA indicating that the wireless handset had disconnected. If the answer in decision block 1428 is yes, block 1424 sends a DISCONNECT message to communication switching system 107, and blocks 1431 and 1432 are executed. If the answer in decision block 1428 is no, block 1433 performs error recovery.

Returning to decision block 1420, if the answer is no, decision block 1418 determines if the state is call forwarding wait idle. If the answer is yes, decision block 1419 determines if an INFO message was received indicating that the requested call forwarding action had been executed. The INFO message received here is the INFO message that communication switching system 107 sends out intending to turn on or turn off the call forwarding indicator. If the answer in decision block 1419 is yes, block 1421 sends the ANSWERED message to the appropriate TMA.

Returning to decision block 1418, if the answer is no, control is transferred to decision block 1501 of FIG. 15. Decision block 1501 determines if the state is active. If the answer is yes, decision block 1502 determines if a call forwarding message had been received from a TMA. If the answer is yes, block 1503 sends an INFO to communication switching system 107 to execute the call forwarding feature. After execution of block 1503, block 1504 sets the state to call forwarding wait active. If the answer in decision block 1502 is no, control is transferred to decision block 1506 which determines if the call forwarding cancel message was received from a TMA. If the answer is yes, block 1507 sends an INFO message to turn off the call forwarding indicator and block 1508 sets the state to call forwarding wait active.

Returning to decision block 1506, if the answer is no, decision block 1509 determines if a DROP message was received from a TMA. If the answer is yes, block 1511 sends a DISCONNECT message to communication switching system 107 and block 1514 sets the state to idle. If the answer in decision block 1509 is no, decision block 1512 determines if a DISCONNECT message was received from communication switching system 107. If the answer is yes, block 1513 sends a DROP message to the appropriate TMA, and block 1514 sets the state to idle.

If the answer in decision block 1512 is no, decision block 1516 checks if a TRANSFER message was received from a TMA. If the answer is yes, block 1517 sends an INFO message with the designation digits to communication switching system 107. If the answer in decision block 1516 is no, decision block 1518 determines if a switchover message was received from a TMA. If the answer is no, error recovery is done by block 1433 of FIG. 14. If the answer is yes, block 1519 sends an INFO message to communication switching system 107 requesting the switchover, and block 1531 sets the state to switchover. Communication switching system 107 is responsive to the INFO message to place the present active line appearance on hold and switch to the second active line appearance. Communication switching system 107 then sends back an INFO message to the TEA indicating whether the new active line appearance has an active call or is idle.

Returning to decision block 1501, if the answer is no, decision block 1521 determines if the state is call forwarding wait active. If the answer is yes, decision block 1522 determines if an INFO message was received from communication switching system 107. If the answer is no, block 1523 sends an ANSWERED message to the TMA, and block 1524 sets the state to active.

Returning to decision block 521, if the answer is no, decision block 1526 determines if the state is switchover. If the answer is yes, decision block 1526 determines if an INFO message was received. If the answer is yes, decision block 1528 determines if the new line appearance is active or idle. If the line appearance is idle, block 1529 sends an internal INFO message to the TMA indicating an active call, and block 1530 sets the state to active. If the answer in decision block 1528 is no, block 1532 sends an internal INFO message to the TMA indicating that the line appearance is idle, and block 1533 sets the state to idle.

It is to be understood that the above-described embodiments are merely illustrative of the principles of the invention and that other arrangements may be devised by those skilled in the art without departing from the spirit and scope of the invention. In particular, it would be apparent to one skilled in the art that the invention could be applied to switching systems other than telecommunication switching systems.

The invention claimed is:

1. A method for providing telecommunication features to wireless telecommunication terminals interconnected to a mobility switch node that is connected to a telecommunication switching system via a plurality of telecommunication links and the mobility switch node is executing a plurality of first type of applications and plurality of second type of applications, the method comprising the steps of:

receiving a control message by one of the plurality of first type of applications in the mobility switch node from a wireless telecommunication terminal requesting execution of a telecommunication feature;

converting the control message by the one of the plurality of first type of applications to an internal protocol message to designate the execution of the telecommunication feature;

transmitting the internal protocol message requesting execution of the telecommunication feature by the one of the plurality of first type of applications to one of a plurality of second type of applications;

receiving the transmitted internal protocol message and converting the internal protocol message to a telecommunication link protocol message by one of the plurality of second type of applications to designate the execution of the telecommunication feature;

transmitting the telecommunication link protocol message via one of the plurality of telecommunication links individually assigned to the telecommunication terminal by the one of the plurality of second type of applications to the telecommunication switching system that performs the requested telecommunication feature as if a telecommunication terminal was connected to the telecommunication switching system via the one of the plurality of telecommunication links.

2. The method of claim 1 wherein there are a plurality of wireless telecommunication terminal types and each of the plurality of first type of applications communicates with only one of the plurality of wireless telecommunication terminal types.

3. The method of claim 2 wherein there are a plurality of telecommunication link types and each of the plurality of second type of applications communicates with only one of the plurality of telecommunication link types.

4. The method of claim 3 wherein the step of transmitting the telecommunication link protocol message comprises the step of emulating a type of telecommunication terminal that could be connected to the one of the telecommunication links.

5. The method of claim 1 wherein another mobility switch node is interconnected to the mobility switch node via another plurality of telecommunication links and the other mobility switch node is executing another plurality of first type of applications and the wireless telecommunication terminal connects to the other mobility switch node, the method further comprises the steps of transmitting another control message requesting the execution of the telecommunication feature by the telecommunication terminal to one of the plurality of other first type of applications in the other mobility switch node;

receiving and converting the other control message to another internal protocol message by the one of the other plurality of first type of applications;

transmitting the other internal protocol message by the one of the other plurality of first type of applications to the one of the plurality of second type of applications in the mobility switch node;

converting the other internal protocol message to an other telecommunication link protocol message by the one of plurality of second type of applications; and transmitting the other telecommunication link protocol message via the one of the plurality of telecommunication links by the one of plurality of second type of applications to the telecommunication switching system that performs the requested telecommunication feature.

6. A method for providing telecommunication service to a plurality of wireless handsets interconnected to a mobility switch node via a plurality of base stations and the mobility switch node interconnected to a telecommunication switching system by a plurality of telecommunication links with each of the plurality of the telecommunication links individually assigned to a one of the plurality of wireless handsets, and the mobility switch node is executing a plurality of first type of applications and a plurality of second type of applications, the method comprising the steps of:

receiving by one of the plurality of first type of applications a control message requesting a telecommunication call origination transmitted by one of the plurality of wireless handsets via one of the plurality of base stations;

converting the control message to an internal protocol message requesting call origination by the one of the plurality of first type of applications;

transmitting the internal protocol message to the one of a plurality of second type of applications by the one of the plurality of first type of applications;

receiving the transmitted internal protocol message by one of the plurality of second type of applications;

converting the transmitted internal protocol message to telecommunication link information by the one of the plurality of second type of applications;

identifying the one of the plurality of telecommunication links individually assigned to the telecommunication terminal by the one of the plurality of second type of applications; and transmitting the telecommunication link information via the one of the plurality of telecommunication links by the one of plurality of second type of applications to the telecommunication switching system for establishment of the telecommunication call by the telecommunication switching system.

7. The method of claim 6 wherein there are a plurality of wireless handsets types and each of the plurality of first type of applications communicates with only one of the plurality of wireless handset types.

8. The method of claim 7 wherein there are a plurality of telecommunication link types and each of the plurality of second type of applications communication with only one of the plurality of telecommunication link types.

9. The method of claim 8 wherein the step of transmitting the telecommunication link information comprises the step of emulating a type of wireless handsets that could be connected to the one of the telecommunication links.

10. The method of claim 6 wherein another mobility switch node is interconnected to the mobility switch node via another plurality of telecommunication links a second plurality of base stations is connected to the other mobility switch node and the other mobility switch node is executing another plurality of first type of applications and the one of the plurality wireless handsets connecting to one of the other plurality of base stations, the method further comprises the steps of receiving and converting another control message requesting another telecommunication call origination to another internal protocol message by the one of the other plurality of first type of applications that was transmitted by the one of the plurality wireless handsets via the one of the other plurality of base stations;

transmitting the other internal protocol message by the one of the other plurality of first type of applications to the one of the plurality of second type of applications in the mobility switch node;

converting the other internal protocol message to other telecommunication link information by the one of plurality of second type of applications;

identifying the one of the plurality of telecommunication links assigned to the one of the plurality wireless handsets by the one of plurality of second type of applications; and transmitting the other telecommunication link information message via the one of the plurality of telecommunication links by the one of plurality of second type of applications to the telecommunication switching system for the establishment of another telecommunication call.

11. A method of controlling wireless communication calls from wireless handsets via a plurality of base stations, a mobility switch node, and a telecommunication switching system, and the mobility switch node executing a plurality of terminal management application and a plurality of terminal emulator application and the mobility switch node provides service for a plurality of wireless handset types, and the telecommunication switching system can have connected a plurality of station set types using a plurality of telephone links of a plurality of telephone link types and there is one assigned telephone link of the plurality of telephone links between the mobility switch node ad telecommunication switching system for each wireless handset, the method comprising the steps of;

determining a first one of the plurality of terminal management applications servicing a first wireless handset based on the first wireless handset being of a first wireless handset type by a first base station in response to a first control message from the first wireless handset;

transmitting the first control message to the first one of the plurality of terminal management application by the first base station;

determining a first one of the plurality of terminal emulator applications by the first terminal management application controlling a telephone link assigned to the first wireless handset in response to the first control message and a telephone number of the first wireless handset;

transmitting a first message of an internal protocol to the first one of the plurality of terminal emulator applications by the first one of the plurality of terminal management applications whereby the the first message directs the first one of the plurality of terminal emulator applications to perform the operations requested in the first control message from the first wireless handset; and emulating by the first one of the plurality of terminal emulator applications a type of station set that could be connected to the telephone link assigned to the first wireless handset and controlling the assigned telephone link so that the telecommunication switching system provides the requested operations.

12. The method of claim 11 further comprising the steps of emulating a type of station set that could be connected to a second telephone link to answer an incoming telephone call by a second one of the plurality of terminal emulator applications upon the incoming telephone call being directed to the second telephone link assigned to a second wireless handset by the telecommunication switching system in response to a destination telephone number of the incoming telephone call applications;

determining a second one of the plurality of terminal management applications servicing the second wireless handset by the second one of the plurality of terminal emulator applications in response to incoming call and an identity of the second link;

transmitting a second message of the internal protocol indicating the incoming call to the second one of the plurality of terminal management applications by the second one of the plurality of terminal emulator applications; and transmitting a second control message to the second wireless handset via a second base station.

13. The method of claim 12 wherein each one of the plurality of terminal management applications is dedicated to one wireless handset type.

14. The method of claim 13 wherein each one of the plurality of terminal management applications is dedicated to one telephone link type.

15. The method of claim 14 wherein another mobility switch node is interconnected to the mobility switch node via a telecommunication link, the other mobility switch node provides service for another plurality of wireless handsets via another plurality of base stations, and the other mobility switch node executes another plurality of terminal management applications identical to the plurality of terminal management applications, the method further comprises determining one of the second plurality terminal management applications servicing a wireless handset of the other plurality of wireless handsets based on that wireless handset being of a first wireless handset type by a base station of the other plurality of base stations in response to a third control message from the wireless handset of the other plurality of wireless handsets;

transmitting the third control message to the first one of the other plurality of terminal management applications by the base station of the other plurality of base stations;

determining the one of the plurality of terminal emulator applications by the one of the other plurality terminal management applications controlling a telephone link assigned to the wireless handset of the other plurality of wireless handsets in response to the third control message and a telephone number of the wireless handset of the other plurality of wireless handsets; and transmitting a first message of an internal protocol to the first one of the plurality of terminal emulator applications by the one of the other plurality of terminal management applications whereby the third message directs the first one of the plurality of terminal emulator applications to perform the operations requested in the third control message from the first wireless handset of the other plurality of wireless handsets.

16. A method of controlling wireless communication calls from wireless handsets via base stations, mobility switch node, and a telecommunication switching system, and the mobility switch node executing a plurality of terminal management applications and a plurality of terminal emulator applications and the mobility switch node provides service for a plurality of wireless handset types, and the telecommunication switching system can have connected a plurality of station set types and there is one standard telephone link of a plurality of standard telephone link types between the mobility switch node and telecommunication switching system for each wireless handset, the method comprising the steps of:

determining a requested one of a plurality of call features from a first control message type received from a wireless handset of a first wireless handset type via a base station by a first terminal management application;

sending a first internal protocol message designating the requested one of the plurality of call features to a first terminal emulator application by the first terminal management application;

transmitting first control information to the telecommunication switching system in response to the first internal protocol message to perform the requested one of the plurality of call features by the first terminal emulator application emulating one of a plurality of station set types on a first telephone link of a first one of the plurality of standard telephone link types assigned to the first wireless handset whereby it appears to the telecommunication switching system that a station set of one of the plurality of station set types is connected to the telecommunication switching system and is activating the requested one of the plurality of call features;

receiving a second control information via the first telephone link by the first terminal emulator application from the telecommunication switching system in response to the first control information;

sending a second internal protocol message to the first terminal management application in response to the second control information; and transmitting a second control message to the wireless handset by the first terminal management application in response to the second internal protocol message.

17. The method of claim 16 further comprises the steps of determining the requested one of the plurality of call features from the first control message received from a second wireless handset of the first wireless handset type via a base station by the first terminal management application;

sending the first internal protocol message designating the requested one of the plurality of a call features to a second terminal emulator application by the first terminal management application;

transmitting third control information to the telecommunication switching system in response to the first internal protocol message to perform the requested one of the plurality of call features by the second terminal emulator application emulating another one of a plurality of station set types on a second telephone link of another one of the plurality of standard telephone link types assigned to the second wireless handset such that it appears to the telecommunication switching system that a station set of other one of the plurality of station set types is connected to the telecommunication switching system and is activating the requested one of the plurality of call features;

receiving a fourth control information via the second telephone link by the second terminal emulator application from the telecommunication switching system in response to the third control information;

sending the second internal protocol message to the first terminal management application in response to the fourth control information; and transmitting the second control message to the second wireless handset by the first terminal management application in response to the second internal protocol message.

18. A method of claim 17 further comprises the steps of determining the requested one of a plurality of call feature from a third control message type received from a second wireless handset of a third wireless handset type via another base station by a second terminal management application;

sending the first internal protocol message type designating the requested one of the plurality of call feature to the first terminal emulator application by the second terminal management application;

transmitting the first control information type to the telecommunication switching system in response to the first internal protocol message type to perform the requested one of the plurality of call feature by the first terminal emulator application emulating the one of the plurality of station set types on a third telephone link of a first one of the plurality of station set types on a third telephone link types assigned to the third wireless handset whereby it appears to the telecommunication switching system that a station set of the one of the plurality of station set types is connected to the telecommunication switching system and is activating the requested one of the plurality of call features;

receiving second control information type via the third telephone link by the second terminal emulator application from the telecommunication switching system in response to the second control information type;

sending the second internal protocol message type to the second terminal management application in response to the second control information type; and transmitting a third control message type to the second wireless handset by the second terminal management application in response internal protocol message type.

19. The method of claim 18 wherein another mobility switch node is interconnected to the mobility switch node via a telecommunication link and the other mobility switch node provides service for another plurality of wireless handset and the other mobility switch node executes a third terminal management application identical to terminal management application as the first terminal management application, the method further comprises the steps of determining the requested one of a plurality of call features from a fourth control message received from a fourth wireless handset of the first wireless handset type via another base station connected to the second mobility switch node by the third terminal management application;

sending the first internal protocol message via the telecommunication link designating the requested one of the plurality of call features to the first terminal emulator application in the first mobility switch node by the third terminal management application;

transmitting the first control information to the telecommunication switching system in response to the fist internal protocol message to perform the requested one of the plurality of call features by the first terminal emulator application emulating the one of a plurality of station set on a fourth telephone link such that it appears to the telecommunication switching system that a station set of one of the plurality of station set types is connected to the telecommunication switching system and is activating the requested one of the plurality of call features;

receiving the second control information via the fourth telephone link by the first terminal emulator application from the telecommunication switching system in response to the first control information;

sending the second internal protocol message to the third terminal management application in response to the second control information; and transmitting the second control message to the fourth wireless handset by the third terminal management application in response to the second internal protocol message.

20. An apparatus for providing telecommunication features to wireless telecommunication terminals interconnected to a mobility switch node that is connected to a telecommunication switching system via a plurality of telecommunication links, and the mobility switch node is executing a plurality of terminal management applications and a plurality of terminal emulator applications, comprising:

means, in one of the plurality of terminal management applications, for receiving a control message from a wireless telecommunication terminal requesting execution of a telecommunication feature;

means, in the one of the plurality of terminal management applications, for converting the control message to an internal protocol message to designate the execution of the telecommunication feature;

means, in the one of the plurality of terminal management applications, for transmitting the internal protocol message requesting execution of the telecommunication feature to one of a plurality of terminal emulator applications;

means, in the one of a plurality of terminal emulator applications, for receiving the transmitted internal protocol message and converting the internal protocol message to telecommunication link information to designate the execution of the telecommunication feature;

means, in the one of plurality of terminal emulator applications, for transmitting the telecommunication link information via one of the plurality of telecommunication links individually assigned to the telecommunication terminal to the telecommunication switching system that performs the requested telecommunication feature as if a telecommunication terminal was connected to the telecommunication switching system via the one of the plurality of telecommunication links.

21. The apparatus of claim 20 wherein there are a plurality of wireless telecommunication terminal types and each of the plurality of terminal management applications communicates with only one of the plurality of wireless telecommunication terminal types.

22. The apparatus of claim 21 wherein there are a plurality of telecommunication link types and each of the plurality of terminal emulator applications communicates with only one of the plurality of telecommunication link types.

23. The apparatus of claim 22 wherein the means for transmitting the telecommunication link information comprises means for emulating a type of telecommunication terminal that could be connected to the one of the telecommunication links.

24. The apparatus of claim 20 wherein another mobility switch node is interconnected to the mobility switch node via another plurality of telecommunication links and the other mobility switch node is executing another plurality of terminal management applications and the wireless telecommunication terminal connects to the other mobility switch node, the apparatus further comprises means for transmitting another control message requesting the requesting the execution of the telecommunication feature by the telecommunication terminal to one of the plurality of other terminal management applications in the other mobility switch node;

means, in the one of the other plurality of terminal management applications, for receiving and converting the other control message to another internal protocol message; means, in the one of the other plurality of terminal management applications, for transmitting the other internal protocol message to the one of the plurality of terminal emulator applications in the mobility switch node;

means, in the one of plurality of terminal emulator applications, for converting the other internal protocol message to other telecommunication link information; and means, in the one of plurality of terminal emulator applications, for transmitting the other telecommunication link information message via the one of the plurality of telecommunication links to the telecommunication switching system that performs the requested telecommunication feature.

25. An apparatus for providing telecommunication service to a plurality of wireless handsets interconnected to mobility switch node via plurality of base stations and the mobility switch node interconnected to a telecommunication switching system by a plurality of telecommunication links with each of the plurality of the telecommunication links individually assigned to a one of the plurality of wireless handset, and the mobility switch node is executing a plurality of terminal management applications and a plurality of terminal emulator applications, comprising;

means, in one of the plurality of terminal management applications, for receiving a control message requesting a telecommunication call origination by the one of the plurality of wireless handset via one of the plurality of base station;

means, in the one of the plurality of terminal management applications, for converting the control message to an internal protocol message requesting call origination;

means, in the one of the plurality of terminal management applications, for transmitting the internal protocol message to the one of a plurality of terminal emulator applications;

means, in one of the plurality of terminal emulator applications, for receiving the transmitted internal protocol message;

means, in the one of the plurality of terminal emulator applications, for converting the transmitted internal protocol message to the telecommunication link information;

means, in the one of the plurality of terminal emulator applications, for identifying the one of the plurality of telecommunication links individually assigned to the telecommunication terminal; and means, in the one of the plurality of terminal emulator applications, for transmitting the telecommunication link information via the one of the plurality of telecommunication links to the telecommunication switching system for establishment of the telecommunication call by the telecommunication switching system.

26. The apparatus of claim 25 wherein there are a plurality of wireless handsets types and each of the plurality of terminal management applications communicates with only telecommunication terminal types.

27. The apparatus of claim 26 wherein there are a plurality of telecommunication link types and each of the plurality of terminal emulator applications communicates with only one of the plurality of telecommunication link types.

28. The apparatus of claim 27 wherein the step of transmitting the telecommunication link information comprises the step of emulating a type of wireless handsets that could be connected to the one of the telecommunication links.

29. The apparatus of claim 25 wherein another mobility switch node is interconnected to the mobility switch node via another plurality of telecommunication links a second plurality of base stations is connected to the other mobility switch node and the other mobility switch node is executing another plurality of terminal management applications and the one of the plurality wireless handsets connecting to one of the other plurality of base stations, the apparatus further comprises;

means, in the one of the other plurality of terminal management applications, for receiving and converting another control message requesting another telecommunication call origination by the one of the plurality wireless handsets via the one of the other plurality of base stations to another internal protocol message;

means, in the one of the other plurality of terminal management applications, for transmitting the other internal protocol message to the one of the plurality of terminal emulator applications in the mobility switch node;

means, in the one of plurality of terminal emulator applications, for converting the other internal protocol message to other telecommunication link information;

means, in the one of plurality of terminal emulator applications, for identifying the one of the plurality of telecommunication links assigned to the one of the plurality wireless handsets; and means, in the one of plurality of terminal emulator applications, for transmitting the other telecommunication link information message via the one of the plurality of telecommunication links to the telecommunication switching system for the establishment of another telecommunication call.

30. An apparatus for controlling wireless communication calls from wireless handsets via a plurality of base stations, a mobility switch node, and a telecommunication switching system, and the mobility switch node executing a plurality of terminal management applications and a plurality of terminal emulator applications and the mobility switch node provides service for a plurality of wireless handset types, and the telecommunication switching system can have connected a plurality of station set types using a plurality of telephone links of a plurality of telephone link types and there is one assigned telephone link of the plurality of telephone links between the mobility switch node and telecommunication switching system for each wireless handset, comprising:

means in the first base station for determining a first one of the plurality of terminal management applications servicing a first wireless handset based on the first wireless handset being of a first wireless handset type by a first base station in response to a first control message from the first wireless handset;

means in the first base station for transmitting the first control message to the first one of the plurality of terminal management applications;

means in the first terminal management application for determining a first one of the plurality of terminal emulator applications controlling a telephone link assigned to the first wireless handset in response to the first control message and a telephone number of the first wireless handset;

means in the first one of the plurality of terminal management applications for transmitting a first message of an internal protocol to the first one of the plurality of terminal emulator applications whereby the first message directs the first one of the plurality of terminal emulator applications to perform the operations requested in the first control message from the first wireless handset; and means in the first one of the plurality of terminal emulator applications for emulating a type of station set that could be connected to the telephone link assigned to the first wireless handset and controlling the assigned telephone link so that the telecommunication switching system provides the requested operations.

31. The apparatus of claim 30 further comprises means in a second one of the plurality of terminal emulator applications for emulating a type of station set that could be connected a second telephone link to answer an incoming telephone call from the telecommunication switching system;

means in the second one of the plurality of terminal emulator applications for determining a second one of the plurality of terminal management applications servicing the second wireless handset in response to incoming call and an identity of the second link;

means in the second one of the plurality of terminal emulator applications for transmitting a second message of the internal protocol indicating the incoming call to the second one of the plurality of terminal management applications; and means in the second one of the plurality of terminal management applications for transmitting a second control message to the second wireless handset via a second base station.

32. The apparatus of claim 31 wherein each one of the plurality of terminal management applications is dedicated to one wireless handset type.

33. The apparatus of claim 32 wherein each one of the plurality of terminal management applications is dedicated to one telephone link type.

34. The apparatus of claim 33 wherein another mobility switch node is interconnected to the mobility switch node via a telecommunication link, the other mobility switch node provides service for another plurality of wireless handsets via another plurality of base stations, and the other mobility switch node executes another plurality of terminal management applications identical to the plurality of terminal management applications, the apparatus further comprises means in a base station of the other plurality of base stations for determining one of the second plurality terminal management applications servicing a wireless handset of the other plurality of wireless handsets based on that wireless handset being of a first wireless handset type in response to a third control message from the wireless handset of the other plurality of wireless handsets;

means in the base station of the other plurality of base stations for transmitting the third control message to the first one of the other plurality of terminal management applications;

means in the one of the plurality terminal management applications for determining the one of the other plurality of terminal emulator applications controlling a telephone link assigned to the wireless handset of the other plurality of wireless handsets in response to the third control message and a telephone number of the third wireless handset of the other plurality of wireless handsets; and means in the one of the other plurality of terminal management applications for transmitting a first message of an internal protocol to the first one of the plurality of terminal emulator applications whereby the third message directs the first one of the plurality of terminal emulator applications to perform the operations requested in the third control message from the wireless handset of the other plurality of wireless handsets.

35. An apparatus of controlling wireless communication calls from wireless handsets via base stations, mobility switch node, and a telecommunication switching system, and the mobility switch node executing a plurality of terminal management applications and a plurality of terminal emulator applications and the mobility switch node provides service for a plurality of wireless handset types, and the telecommunication switching system can have connected a plurality of station set types and there is one standard telephone link of a plurality of standard telephone link types between the mobility switch node and telecommunication switching system for each wireless handset, comprising:

means in a first terminal management application for determining a requested one of a plurality of call features from a first control message received from a wireless handset of a first wireless handset type via a base station;

means in the first terminal management application for sending a first internal protocol message designating the requested one of the plurality of call features to a first terminal emulator application;

means in the first terminal emulator application for transmitting first control information to the telecommunication switching system in response to the first internal protocol message to perform the requested one of the plurality of call features by emulating one of a plurality of station set types on a first telephone link of a first one of the plurality of standard telephone link types assigned to the first wireless handset whereby it appears to the telecommunication switching system that a station set of one of the plurality of station set types is connected to the telecommunication switching system and is activating the requested one of the plurality of call features;

means in the first terminal emulator application for receiving a second control information via the first telephone link from the telecommunication switching system in response to the first control information;

means in the first terminal emulator application for sending a second internal protocol message to the first terminal management application in response to the second control information; and means in the first terminal management application for transmitting a second control message to the wireless handset in response to the second internal protocol message.

36. The apparatus of claim 35 further comprises means in the first terminal management application for determining the requested one of the plurality of call features from the first control message type received from a second wireless handset of the first wireless handset type via a base station;

means, in the first terminal management application, for sending the first internal protocol message designating the requested one of the plurality of call features to a second terminal emulator application means, in the second terminal emulator application, for transmitting third control information to the telecommunication switching system in response to the first internal protocol message to perform the requested one of the plurality of call features by emulating another one of a plurality of station set types on a second telephone link of another one of the plurality of standard telephone link types assigned to the second wireless handset whereby it appears to the telecommunication switching system that a station set of the other one of the plurality of station set types is connected to the telecommunication switching system and is activating the requested one of the plurality of call features;

means, in the second terminal emulator application, for receiving a fourth control information via the second telephone link from the telecommunication switching system in response to the third control information;

means, in the first terminal emulator application, for sending the second internal protocol message to the first terminal management application in response to the fourth control information; and means, in the first terminal management application, for transmitting the second control message to the second wireless handset in response to the second internal protocol message.

37. The apparatus of claim 36 further comprises means, in a second terminal management application, for determining the requested one of a plurality of call features from a third control message received from a third wireless handset of a second wireless handset via another base station;

means, in the second terminal management application, for sending the first internal protocol message designating the requested one of the plurality of call features to the first terminal emulator application;

means, in the first terminal emulator application, for transmitting the first control information to the telecommunication switching system in response to the first internal protocol message to perform the requested one of the plurality of call features by emulating the one of the plurality of station set types on a third telephone link of the first one of the plurality of standard telephone link types assigned to the third wireless handset whereby it appears to the telecommunication switching system that a station set of the one of the plurality of station set types is connected to the telecommunication switching system and is activating the requested one of the plurality of call features;

means, in the second terminal emulator application, for receiving the second control information via the third telephone link from the telecommunication switching system in response to the second control information;

means, in the second terminal emulator application, for sending the second internal protocol message to the second terminal management application in response to the second control information; and means, in the second terminal management application, for transmitting a third control message to the second wireless handset in response to the second internal protocol message.

38. The apparatus of claim 37 wherein another mobility switch node is interconnected to the mobility switch node via a telecommunication link and the other mobility switch node provides service for another plurality of wireless handsets and the other mobility switch node executes a third terminal management application identical to terminal management application as the first terminal management application, the apparatus further comprises means for determining the requested one of a plurality of call features from a fourth control message received from a fourth wireless handset of the first wireless handset type via another base station connected to the second mobility switch node by a third terminal management application;

means, in the third terminal management application, for sending the first internal protocol message via the telecommunication link designating the requested one of the plurality of call features to the first terminal emulator application in the first mobility switch node;

means, in the first terminal emulator application, for transmitting the first control information to the telecommunication switching system in response to the first internal protocol message to perform the requested one of the plurality of call features by emulating the one of a plurality of station set types on a fourth telephone link whereby it appears to the telecommunication switching system that a station set of one of the plurality of station set types is connected to the telecommunication switching system and is activating the requested one of the plurality of call features;

means in the first terminal emulator application for receiving the second control information via the fourth telephone link from the telecommunication switching system in response to the first control information;

means in the first terminal emulator application for sending the second internal protocol message to the third terminal management application in response to the second control information; and means in the third terminal management application for transmitting the second control message to the fourth wireless handset in response to the second internal protocol message.

\* \* \* \* \*